(12) United States Patent
Yao et al.

(10) Patent No.: US 12,279,218 B2
(45) Date of Patent: Apr. 15, 2025

(54) EXTENDING A TIME GAP RANGE FOR NON-TERRESTRIAL NETWORKS

(71) Applicant: Apple Inc., Cupertino, CA (US)

(72) Inventors: Chunhai Yao, Beijing (CN); Chunxuan Ye, Beijing (CA); Dawei Zhang, Cupertino, CA (US); Haijing Hu, Cupertino, CA (US); Haitong Sun, Cupertino, CA (US); Hong He, Cupertino, CA (US); Oghenekome Oteri, Cupertino, CA (US); Sarma V. Vangala, Cupertino, CA (US); Sigen Ye, Cupertino, CA (US); Wei Zeng, Cupertino, CA (US); Weidong Yang, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,239

(22) PCT Filed: Aug. 7, 2020

(86) PCT No.: PCT/CN2020/107964
§ 371 (c)(1),
(2) Date: Feb. 10, 2022

(87) PCT Pub. No.: WO2022/027654
PCT Pub. Date: Feb. 10, 2022

(65) Prior Publication Data
US 2023/0156646 A1    May 18, 2023

(51) Int. Cl.
*H04W 56/00* (2009.01)
*H04B 7/185* (2006.01)
(Continued)

(52) U.S. Cl.
CPC ...... *H04W 56/0045* (2013.01); *H04B 7/1851* (2013.01); *H04W 72/0446* (2013.01); *H04W 72/1268* (2013.01); *H04W 74/0833* (2013.01)

(58) Field of Classification Search
CPC ......... H04W 72/02; H04W 4/06; H04W 4/40; H04W 4/46; H04L 1/08; H04L 1/1812;
(Continued)

(56) References Cited

U.S. PATENT DOCUMENTS

| 9,722,758 | B2 | 8/2017 | Ding et al. |
|---|---|---|---|
| RE49,136 | E | 7/2022 | Jang et al. |

(Continued)

FOREIGN PATENT DOCUMENTS

| CN | 101425839 A | 5/2009 |
|---|---|---|
| CN | 110024318 A | 7/2019 |

(Continued)

OTHER PUBLICATIONS

Examination Report for Indian Patent Application No. 202317008462 dated Oct. 10, 2023, 6 pages.

(Continued)

*Primary Examiner* — Nizam U Ahmed
(74) *Attorney, Agent, or Firm* — Kubota & Basol LLP

(57) ABSTRACT

A base station that determines a slot for uplink reception for a non-terrestrial network link between a base station and a user equipment is described. In exemplary embodiments, the base station determines a timing advance based on at least a random access preamble reception and determines an uplink offset based on the timing advance. The base station may further determine a candidate slot for an uplink reception based on at least the offset. In addition, the base station may determine if the candidate slot is available for the uplink reception. The base station may use the candidate slot for the uplink reception when the candidate uplink slot is available
(Continued)

and may use the next available slot for the uplink reception when the candidate uplink slot is not available.

19 Claims, 16 Drawing Sheets

(51) Int. Cl.
  *H04W 72/0446* (2023.01)
  *H04W 72/1268* (2023.01)
  *H04W 74/0833* (2024.01)

(58) Field of Classification Search
  CPC ... H04L 5/0053; H04L 5/0007; H04L 1/1822; H04L 5/0044; H04L 2001/0092; H04L 1/1825; H04L 1/1671; H04L 5/0055; H04B 7/024
  See application file for complete search history.

(56) References Cited

U.S. PATENT DOCUMENTS

| | | |
|---|---|---|
| 2007/0032237 A1 | 2/2007 | Chang et al. |
| 2009/0111445 A1 | 4/2009 | Ratasuk et al. |
| 2010/0202430 A1 | 8/2010 | Chin et al. |
| 2013/0301451 A1 | 11/2013 | Siomina et al. |
| 2015/0085794 A1 | 3/2015 | Chen et al. |
| 2016/0044656 A1 | 2/2016 | Novak et al. |
| 2018/0160440 A1 | 6/2018 | Hosseini et al. |
| 2018/0352513 A1 | 12/2018 | Jamadagni et al. |
| 2019/0159149 A1 | 5/2019 | Ryu et al. |
| 2019/0174530 A1 | 6/2019 | Kim et al. |
| 2019/0182827 A1 | 6/2019 | Wang et al. |
| 2019/0230689 A1 | 7/2019 | Cao et al. |
| 2019/0274146 A1 | 9/2019 | Tang et al. |
| 2019/0327732 A1 | 10/2019 | Yoon |
| 2019/0349116 A1 | 11/2019 | Hosseini et al. |
| 2019/0394741 A1 | 12/2019 | Cui et al. |
| 2020/0015274 A1 | 1/2020 | Islam et al. |
| 2020/0029364 A1 | 1/2020 | Wang et al. |
| 2020/0178220 A1 | 6/2020 | Kang et al. |
| 2020/0252959 A1 | 6/2020 | Sun et al. |
| 2020/0245317 A1 | 7/2020 | Hwang et al. |
| 2020/0252949 A1 | 8/2020 | Kim et al. |
| 2020/0336253 A1 | 10/2020 | He et al. |
| 2020/0351955 A1* | 11/2020 | Jeon ..................... H04W 80/02 |
| 2021/0084622 A1* | 3/2021 | Choi ..................... H04W 72/21 |
| 2021/0105055 A1 | 4/2021 | Chae et al. |
| 2021/0105716 A1 | 4/2021 | Wu et al. |
| 2021/0132144 A1 | 5/2021 | An et al. |
| 2021/0144750 A1 | 5/2021 | Cao et al. |
| 2021/0194572 A1* | 6/2021 | Gu ..................... H04W 56/006 |
| 2021/0211232 A1 | 7/2021 | Hwang et al. |
| 2021/0227620 A1 | 7/2021 | Pan et al. |
| 2021/0314967 A1 | 10/2021 | Wang et al. |
| 2021/0320760 A1 | 10/2021 | Rastegardoost et al. |
| 2021/0321448 A1 | 10/2021 | Zewail et al. |
| 2021/0345392 A1 | 11/2021 | Ma et al. |
| 2021/0385793 A1 | 12/2021 | Abotabl et al. |
| 2021/0400714 A1* | 12/2021 | Huang ................. H04W 72/23 |
| 2022/0007384 A1 | 1/2022 | Xu et al. |
| 2022/0015128 A1 | 1/2022 | Liao et al. |
| 2022/0132593 A1* | 4/2022 | Ren ................... H04W 56/0045 |
| 2022/0159593 A1 | 5/2022 | Jeon et al. |

FOREIGN PATENT DOCUMENTS

| | | |
|---|---|---|
| CN | 110463292 A | 11/2019 |
| CN | 110876188 A | 3/2020 |
| CN | 111165030 A | 5/2020 |
| JP | 2019-537313 A | 12/2019 |
| JP | 2020-523855 A | 8/2020 |
| WO | 2013/171138 A2 | 11/2013 |
| WO | 2019/160387 A1 | 8/2019 |
| WO | 2019/161044 A1 | 8/2019 |
| WO | 2020/042808 A1 | 3/2020 |
| WO | 2020089471 A1 | 5/2020 |

OTHER PUBLICATIONS

International Preliminary Report on Patentability received for PCT Patent Application No. PCT/CN2020/107967, mailed on Feb. 16, 2023, 5 pages.
International Search Report and Written Opinion received for PCT Patent Application No. PCT/CN20/107967, mailed on Apr. 25, 2021, 7 pages.
Nokia, "Doppler Compensation, Uplink Timing Advance and Random Access in NTN", 3GPP TSG RAN WG1 #99 R1-1913017, Nov. 18-22, 2019, pp. 1-28.
Notice of Reasons for Refusal received for Japanese Patent Application No. 2023-508508, mailed on Feb. 8, 2024, 10 pages (5 pages of English Translation and 5 pages of Original Document).
Sharp, "Resource allocation mode 1 for NR sidelink", 3GPP TSG RAN WG1 Meeting #99, Reno USA, Nov. 18-22, 2019, R1-1912758, 4 pages.
CATT, "PRACH design and UL timing advance", 3GPP TSG RAN WG1 Meeting #97 R1-1906325, May 13-17, 2019, 7 pages.
CMCC, "Discussion on supporting TDD duplex scheme for NTN", 3GPP TSG RAN WG1 #99 R1-1912538, Nov. 18-22, 2019, pp. 1-11.
CMCC, "Discussion on UL transmission timing for NTN", 3GPP TSG RAN WG1 #99, Reno, USA, R1-1912535, Nov. 18-22, 2019, pp. 1-3.
Fraunhofer IIS, "NR-NTN: Timing Relationship Enhancements", 3GPP TSG-RAN WG1 e-Meeting #102 R1-2005548, Aug. 17-28, 2020, pp. 1-8.
Fujitsu, "Discussion on mode 1 resource allocation for NR V2X", 3GPP TSG RAN WG1 #99 R1-1912078, Nov. 18-22, 2019, 6 pages.
Notice of Allowance received for U.S. Appl. No. 18/454,588, mailed on Apr. 24, 2024, 2 pages.
Notice of Reasons for Refusal received for Japanese Patent Application No. 2023-508506, mailed on Feb. 8, 2024, 13 pages (6 pages of English Translation and 7 pages of Original Document).
Supplementary European Search Report and Search Opinion received for European Application No. 20948261.1, mailed on Apr. 19, 2024, 13 pages.
Examination Report for India Patent Application No. 202317008460 dated Aug. 23, 2023, 7 pages.
PCT International Search Report and the Written Opinion of the International Searching Authority, or the Declaration, for PCT/CN2020/107964, mailed May 7, 2021, 5 pages.
PCT Written Opinion of the International Searching Authority for PCT/CN2020/107964, mailed May 7, 2021, 4 pages.
3GPP 3rd Generation Partnership Project: Technical Specification Group Radio Access Network: Solutions for NR to support non-terrestrial networks (NTN) (Release 16) 3GPP TR 38.821 V16.0.0 (Dec. 2019) Jan. 16, 2020 (Jan. 16, 2020).
PCT International Preliminary Report on patentability for PCT/CN2020/107964 mailed Feb. 16, 2023, 6 pages.
Ericsson, E: "3GPP TSG-RAN WGl Meeting #102-e Source: Moderator (Ericsson) Title: Feature lead summary on timing relationship enhancements Document for: Discussion", Agenda Item, Jan. 1, 2020, XP055743390.
Notice of Allowance received for U.S. Appl. No. 18/454,588, mailed on Apr. 5, 2024, 9 pages.
Supplementary European Search Report and Search Opinion received for European Application No. 20948888.1, mailed on Mar. 27, 2024, 7 pages.
Extended European Search Report received for European Application No. 20948261.1, mailed on Jul. 10, 2024, 12 pages.
Decision of Refusal a Patent received for Japanese Patent Application No. 2023-508506, mailed on Oct. 1, 2024, 9 pages (4 pages of English Translation and 5 pages of Original Document).
Office Action, including Search Report received for Chinese Patent Application No. 202080103673.3, mailed on Aug. 26, 2024, 16

(56) References Cited

OTHER PUBLICATIONS pages (8 pages of English Translation and 8 pages of Original Document).

* cited by examiner

EXTENDING A TIME GAP RANGE FOR NON-TERRESTRIAL NETWORKS

FIELD OF INVENTION

This invention relates generally to wireless technology and more particularly to applying timing enhancements for a link in a non-terrestrial network

BACKGROUND OF THE INVENTION

In 5G New Radio (NR), there are several different timing relationships that are defined for a Terrestrial Network (TN). For example, $K_0$ is the time gap between the Downlink Control Information (DCI) and the Physical Downlink Shared Channel (PDSCH). In addition, $K_1$ is the time gap between PDSCH reception and Physical Uplink Control Channel (PUCCH) transmission and $K_2$ is the time gap between the DCI and the Physical Uplink Shared Channel (PUSCH). In NR Rel 16, for a Non-Terrestrial Network (NTN), these timing relationships may change because of the larger communications distances involved in NTN by having a wireless link traverse from a ground-based user equipment (UE) to a satellite and back down to a ground-based network (and vice versa). A challenge is to determine how these timing relationships can be changed for an NTN.

SUMMARY OF THE DESCRIPTION

A user equipment (UE) comprising a processor configured to perform the operations that determines an uplink (UL) slot is described. In exemplary embodiments, the UE receives, from a base station, a scaling factor through a first Radio Resource Control (RRC) signal. The UE may further determines an offset through a second RRC signal. In addition, the UE may receive from the base station, downlink control information (DCI) that includes an indication of an initial time gap. Furthermore, the UE may calculate a new time gap by at least applying the scaling factor to the initial time gap and determine a slot of uplink transmission based on at least the new time gap and the offset. The scaling factor is dependent on at least one of a cell size, a beam size, and user equipment capability. For a UE has high capabilities, the scaling factor is 1 and for a UE that has low capabilities, the scaling factor greater than 1. In addition, the scaling factor ranges from 1 to 16.

In addition, the initial time gap is a plurality of time gaps that includes $K_1$ and $K_2$, wherein $K_1$ represents a time gap between a Physical Downlink Shared Channel (PDSCH) reception and a Physical Uplink Control Channel (PUCCH) transmission, and $K_2$ represents a time gap between a Physical Downlink Control Channel (PDCCH) reception and Physical Uplink Shared Channel (PUSCH) transmission. Furthermore, there can be different scaling factors for different K values or different UE. In addition, there can be the same scaling factor for different K values. The initial time gap includes $K_4$ that represents a time gap between a Physical Sidelink Feedback Channel (PSFCH) reception and a Physical Uplink Control Channel (PUCCH) transmission.

In another embodiment, a UE comprising a processor configured to perform the operations that determines an uplink (UL) slot using a scaling factor set is described. In one embodiment, the UE receives, from a base station, a set of scaling factors through a first Radio Resource Control (RRC) signal. The UE may further determine an offset through a second RRC signal. Additionally, the UE may receive, from the base station, downlink control information (DCI) that includes an indication of an initial time gap and an indication of a selected scaling factor that is one of the set of scaling factors. The UE may further calculate a new time gap by at least applying the selected scaling factor to the initial time gap and determine a slot of uplink transmission based on at least the new time gap and the offset. The scaling factor can be dependent on at least one of a cell size, a beam size, and user equipment capability.

In addition, the initial time gap is a plurality of time gaps that includes $K_1$ and $K_2$, wherein $K_1$ represents a time gap between a Physical Downlink Shared Channel (PDSCH) reception and a Physical Uplink Control Channel (PUCCH) transmission, and $K_2$ represents a time gap between a Physical Downlink Control Channel (PDCCH) reception and Physical Uplink Shared Channel (PUSCH) transmission. Furthermore, there can be different scaling factors for different K values or different UE. In addition, there can be the same scaling factor for different K values. The initial time gap includes $K_4$ that represents a time gap between a Physical Sidelink Feedback Channel (PSFCH) reception and a Physical Uplink Control Channel (PUCCH) transmission.

In another embodiment, a baseband processor configured to perform the operations that determines an uplink (UL) slot is described. In exemplary embodiments, the baseband processor receives, from a base station, a scaling factor through a first Radio Resource Control (RRC) signal. The baseband processor may further determine an offset through a second RRC signal. In addition, the baseband processor may receive from the base station, downlink control information (DCI) that includes an indication of an initial time gap. Furthermore, the baseband processor may calculate a new time gap by at least applying the scaling factor to the initial time gap and determine a slot of uplink transmission based on at least the new time gap and the offset.

In another embodiment, a baseband processor configured to perform the operations that determines an uplink (UL) slot using a scaling factor set is described. In one embodiment, the baseband processor receives, from a base station, a set of scaling factors through a first Radio Resource Control (RRC) signal. The baseband processor may further determine an offset through a second RRC signal. Additionally, the baseband processor may receive, from the base station, downlink control information (DCI) that includes an indication of an initial time gap and an indication of a selected scaling factor that is one of the set of scaling factors. The baseband processor may further calculate a new time gap by at least applying the selected scaling factor to the initial time gap and determine a slot of uplink transmission based on at least the new time gap and the offset.

A method and apparatus of a base station comprising a processor configured to perform the operations that determine a slot for uplink reception for a non-terrestrial network link between a base station and a user equipment is described. In exemplary embodiments, the base station determines a timing advance based on at least a random access preamble reception and determines an uplink offset based on the timing advance. The base station may further determine a candidate slot for an uplink reception based on at least the offset. In addition, the base station may determine if the candidate slot is available for the uplink reception. The base station may use the candidate slot for the uplink reception when the candidate uplink slot is available and may use the next available slot for the uplink reception when the candidate uplink slot is not available.

In addition, the uplink reception comprises a Physical Uplink Shared Channel (PUSCH), Random Access Response (RAR) scheduled by PUSCH, Physical Uplink Control Channel (PUCCH), or aperiodic SRS. The base station may further determine if the candidate slot is an uplink slot, a downlink slot, a hybrid slot or a flexible slot based on at least the Time Division Duplex (TDD) configuration of the candidate slot format, wherein the candidate slot is available when the candidate slot is one of an uplink slot or a hybrid slot with the uplink reception corresponding to uplink symbols in the hybrid slot and the candidate slot is unavailable when the candidate slot is one of a downlink slot, a hybrid slot with the uplink reception not corresponding to uplink symbols in the hybrid slot, or a flexible slot.

Furthermore, the uplink offset is a measure of a delay of the non-terrestrial network link. The base station may further compute the uplink offset based on at least a timing advance of one or more satellite links in the non-terrestrial network. In addition, the uplink offset is set equal to a sum of a service link timing advance and a feeder link timing advance, divided by a slot duration. The base station may further compute a Medium Access Control (MAC) Control Element (CE) action timing using at least the uplink offset. The base station may additionally compute a time gap between a last Physical Sidelink Feedback Channel (PSFCH) reception and Physical Uplink Control Channel (PUCCH) transmission using a sidelink offset, where the sidelink offset may have a different value than the uplink offset. The base station may further compute a time domain offset for a type 1 configured grant configuration using at least the uplink offset.

In a further embodiment, a user equipment (UE) comprising a processor configured to perform the operations that determine a slot for a Channel State Information (CSI) reference resource is described. In one embodiment, the UE receives, from a base station, timing advance information. The UE may additionally determine an offset based on the timing advance information. The UE further determines a candidate slot for a Channel State Information (CSI) reference resource based on at least the offset. In addition, the UE may determine if the candidate slot is available for the CSI reference resource. Furthermore, the UE may use the candidate slot for the CSI reference resource when the candidate slot is available and may use another slot for the CSI reference resource when the candidate slot is not available. In addition, the another available CSI reference resource can be a previous slot or a next slot of the candidate slot.

The UE may additionally determine if the candidate slot is an uplink slot, a downlink slot, a hybrid slot or a flexible slot based on at least the Time Division Duplex (TDD) configuration of the candidate slot format, wherein the candidate slot is available if the candidate slot is an uplink slot, a downlink slot, a hybrid slot or a flexible slot based on at least the Time Division Duplex (TDD) configuration of the candidate slot format, wherein the candidate slot is available if the candidate slot is one of a downlink slot or a hybrid slot with the downlink reception corresponding to downlink symbols in the hybrid slot and the candidate slot is unavailable if the candidate slot is one of an uplink slot, a hybrid slot with the downlink reception not corresponding to downlink symbols in the hybrid slot, or a flexible slot.

In another embodiment, a baseband processor that determines a slot for a Channel State Information (CSI) reference resource is described. In one embodiment, the baseband processor receives, from a base station, timing advance information. The baseband processor may additionally determine an offset based on the timing advance information. The baseband processor further determines a candidate slot for a CSI reference resource based on at least the offset. In addition, the baseband processor may determine if the candidate slot is available for the CSI reference resource.

Furthermore, the baseband processor may use the candidate slot for the CSI reference resource when the candidate slot is available and may use another slot for the CSI reference resource when the candidate slot is not available. In addition, the another available CSI reference resource can be a previous slot or a next slot of the candidate slot. In addition, the offset is a measure of a delay of the non-terrestrial network link.

In another embodiment, a non-transitory machine-readable medium having executable instructions, when executed by one or more processing units to perform a method that determines a slot for uplink reception for a non-terrestrial network link between a base station and a user equipment is described. In one embodiment, this method determines a timing advance based on at least a random access preamble reception and determines an uplink offset based on the timing advance. The method may further determine a candidate slot for an uplink reception based on at least the offset. In addition, this method may determine if the candidate slot is available for the uplink reception. The method may use the candidate slot for the uplink reception when the candidate uplink slot is available and may use the next available slot for the uplink reception when the candidate uplink slot is not available.

In a further embodiment, a non-transitory machine-readable medium having executable instructions, when executed by one or more processing units to perform a method that determines a slot for a Channel State Information (CSI) reference resource is described. In one embodiment, this method receives, from a base station, timing advance information. The method may additionally determine an offset based on the timing advance information. The method further determines a candidate slot for a CSI reference resource based on at least the offset. In addition, the method may determine if the candidate slot is available for the CSI reference resource. Furthermore, the method may use the candidate slot for the CSI reference resource when the candidate slot is available and may use another slot for the CSI reference resource when the candidate slot is not available.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
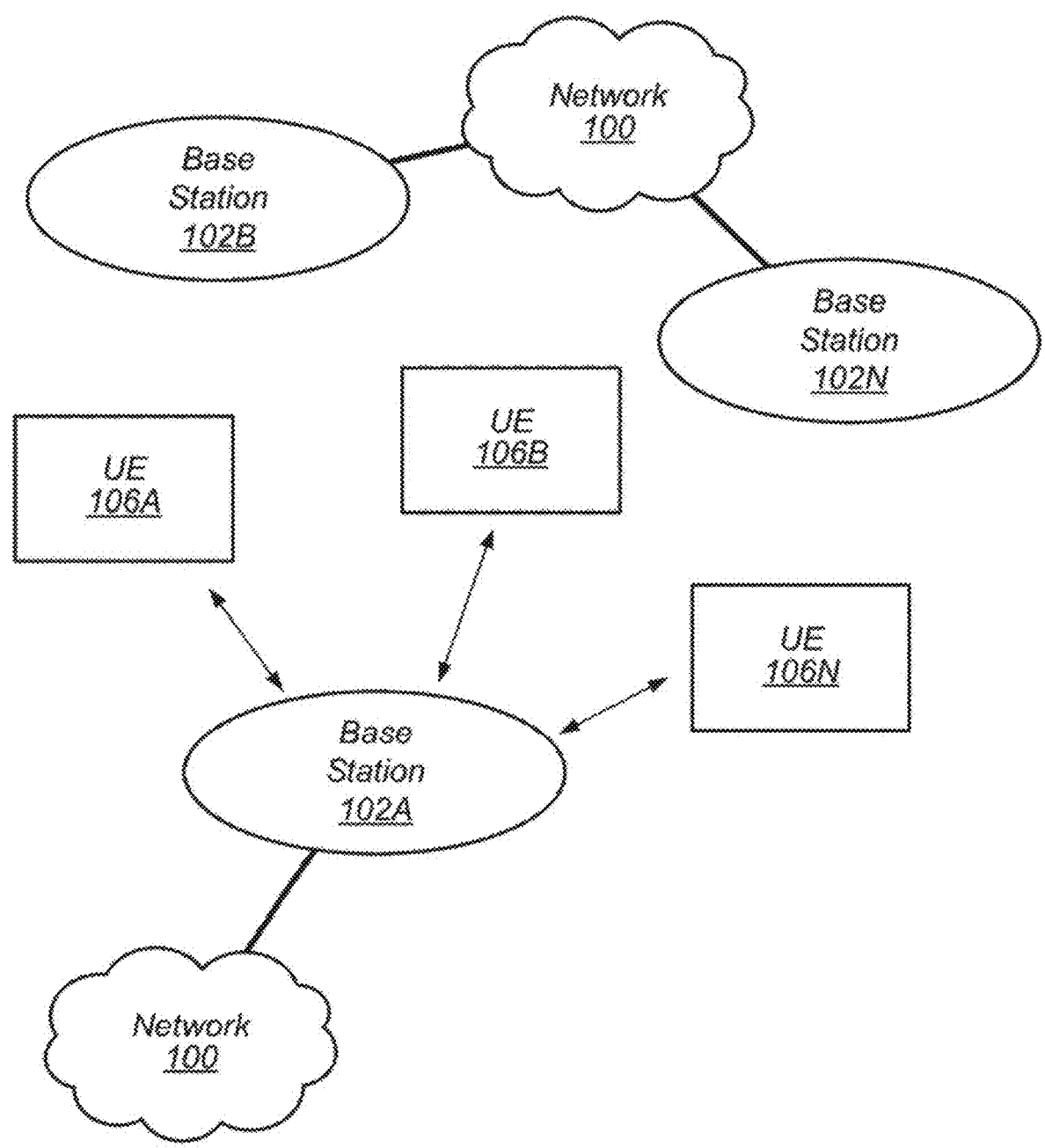
FIG. 1 illustrates an example wireless communication system according to some embodiments.

A method and apparatus of a device that extends a time between downlink and up transmissions for a non-terrestrial network link between a base station and a user equipment is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that extends a time between downlink and up transmissions for a non-terrestrial network link between a base station and a user equipment is described. In some embodiments, a Non-Terrestrial Network (NTN) is a type of wireless communication system that utilizes a satellite system as part of the wireless communication system between a user equipment (UE) and a base station (BS). For timing in NTN systems, the timing relationships are different because of the longer delays involved in communicating data across a satellite based system. In some embodiments, and in the NR Rel 16 NTN study, a timing relationship is achieved by introducing an offset $K_{offset}$, where the PUSCH timing is $$\left\lfloor n \cdot \frac{2^{\mu_{PUSCH}}}{2^{\mu_{PDCCH}}} \right\rfloor + K_2 + K_{offset}.$$

Here, $K_2$ is indicated by the DCI, and $\mu_{PUSCH}$ and $\mu_{PDCCH}$ are the sub-carrier spacing for PUSCH and PDCCH, respectively. In some embodiments, $K_{offset}$ is used to count the large propagation delay from satellite, where $K_{offset}$ is in unit of slots. However, a challenge can be determining the time relationship based on the timing advance (TA). For example and in some embodiments, there will be a need to calculate $K_{offset}$ and also a need to ensure the proper UL slot after an additional slot offset. In addition, the NTN system that includes a UE with low capability of deriving the accurate differential TA, there is a challenge in ensuring that the PUCCH/PUSCH scheduled via $K_1$ and $K_2$, can be received at Next Generation NodeB (gNB) with proper timing. In this embodiment, the existing $K_1$ and $K_2$ value ranges can be small and small $K_1$ and $K_2$ values may not be suitable for UEs with low capability of accurate differential TA acquisition. With the introduction of UE-specific time offset, the slot for uplink transmissions of PUSCH or PUCCH are not guaranteed to be uplink slot, with the existing range of $K_1$ and $K_2$. Hence, it is preferred to extend the range of $K_1$ and $K_2$ for NTN.

In some embodiments, the time offset $K_{offset}$ is introduced for NTN and is added on top of the existing timing of UE transmission types (e.g. DCI scheduled PUSCH, RAR scheduled PUSCH, PUCCH, MAC CE action timing, aperiodic SRS, as well as the CRI-RS reference resource). For example and in some embodiments, the time offset $K_{offset}$ is calculated based on the summation of service link full TA and feeder link TA for transparent satellite. As another example, and in some embodiments, $$K_{offset} = \left\lceil \frac{TA_{service\ link} + TA_{feeder\ link}}{slot\ duration} \right\rceil.$$

In another embodiment, for different satellite systems, $K_{offset}$ may be calculated differently, e.g., is calculated based on the service link full TA for regenerate satellite.

In some embodiments, existing $K_1$ values can range from 0-15 slots and existing $K_2$ values can range from 0-32 slots. For example and in some embodiments, NTN can have large cell size and/or a large differential TA values. In this example, inaccurate differential TA values can be due to a UE's capability. In some embodiments, a scaling factor can be applied to $K_1$, $K_2$ values, where a single scaling factor value for each UE, where there can be different scaling factors for $K_1$ and $K_2$. In addition, the selected scaling factor can depend on UE capability. For example and in some embodiments, for a high capable UE, the scaling configuration is not needed, or configured scaling factor can be 1. Alternatively, for a low capable UE, the configuration can include a single scaling factor that is larger than 1. In another embodiment, a scaling factor can be applied to $K_4$.

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
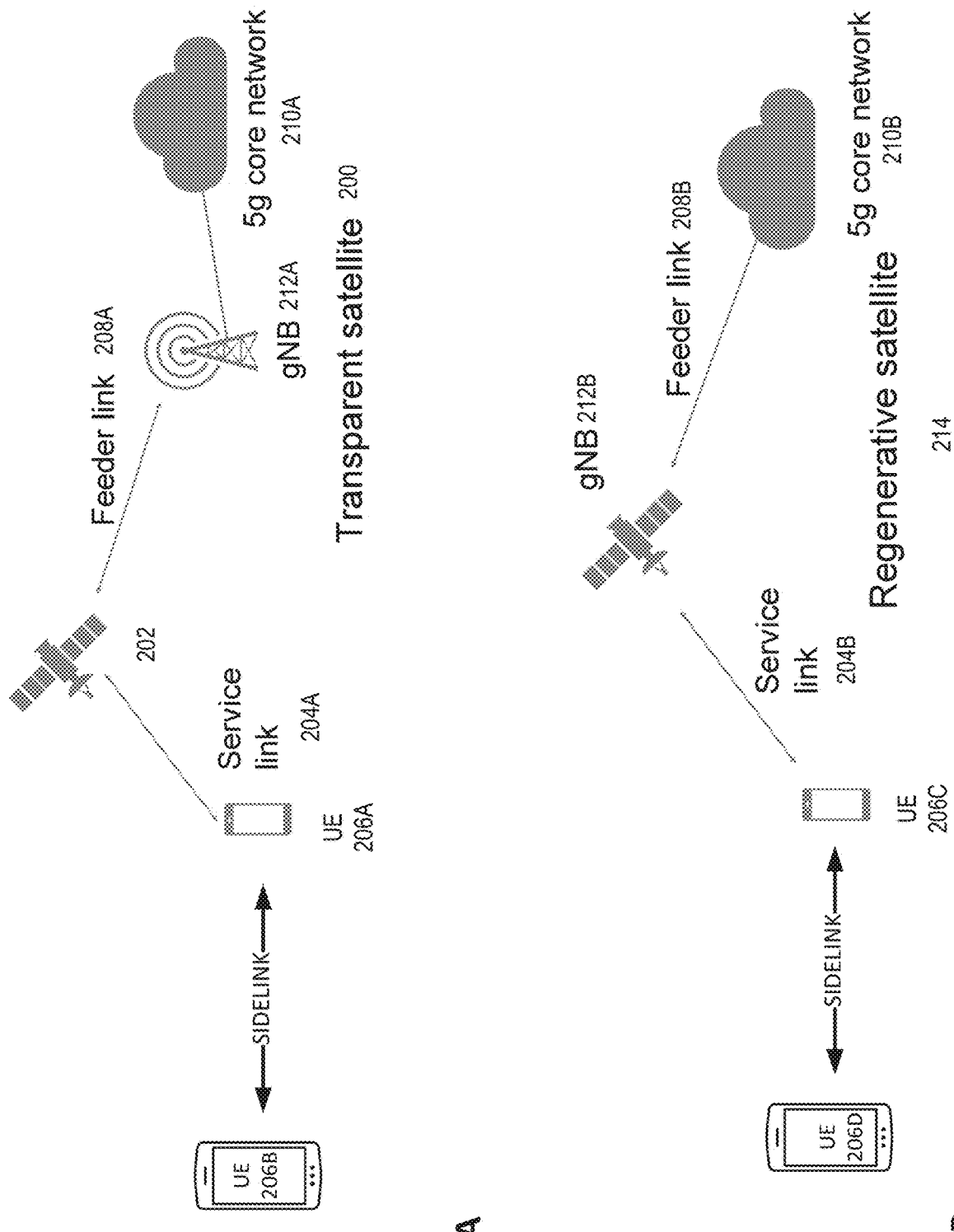
FIG. 2A-B illustrate a base station (BS) in communication with a user equipment (UE) device over a Non-Terrestrial Network (NTN) according to some embodiments.

FIG. 2AB illustrate a base station (BS) in communication with a user equipment (UE) device over a Non-Terrestrial Network (NTN) according to some embodiments. FIG. 2A illustrates user equipment 206A that can be in communication with a 5G core network 210A or another user equipment 206B in direct communication (also known as device to device or sidelink). In some embodiments, the UE 206A can be in communication with the satellite 202 via service link 204A, where the satellite 202 is in communication with the 5G core network 210A via a feeder link 208A and Next Generation NodeB (gNB) 212A.

In some embodiments, sidelink communication can utilize dedicated sidelink channels and sidelink protocols to facilitate communication directly between devices. For example, sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization.

In another embodiment, FIG. 2B illustrates UE 206C that can be in communication with a 5G core network 210B or another UE 206D in direct communication. In some embodiments, the UE 206C can be in communication with the satellite that is a gNB 212B via service link 204B, where the gNB 212B is in communication with the 5G core network 210B via a feeder link 208B.

In addition, sidelink communications can be used for communications between vehicles to vehicles (V2V), vehicle to infrastructure (V2I), vehicle to people (V2P), vehicle to network (V2N), and other types of direct communications.

Returning to FIG. 1, any of UE 106A-N can also be in communication with a base station 102A in through uplink and downlink communications, according to some embodiments. The UEs may each be a device with cellular communication capability such as a mobile phone, a hand-held device, a computer or a tablet, or virtually any type of wireless device. The UEs 106A-N may include a processor that is configured to execute program instructions stored in memory. The UEs 106A-N may perform any of the method embodiments described herein by executing such stored instructions. Alternatively, or in addition, the UEs 106A-N may include a programmable hardware element such as an FPGA (field-programmable gate array) that is configured to perform any of the method embodiments described herein, or any portion of any of the method embodiments described herein.

The UEs 106A-N may include one or more antennas for communicating using one or more wireless communication protocols or technologies. In some embodiments, the UEs 106A-N may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-N may include separate transmit and/or receive chains (e.g., including separate antennas and other radio components) for each wireless communication protocol with which it is configured to communicate. As a further possibility, the UEs 106A-N may include one or more radios which are shared between multiple wireless communication protocols, and one or more radios which are used exclusively by a single wireless communication protocol. For example, the UE 106A-N might include a shared radio for communicating using either of LTE or 5G NR (or LTE or 1×RTT or LTE or GSM), and separate radios for communicating using each of Wi-Fi and Bluetooth. Other configurations are also possible.

Figure 3:
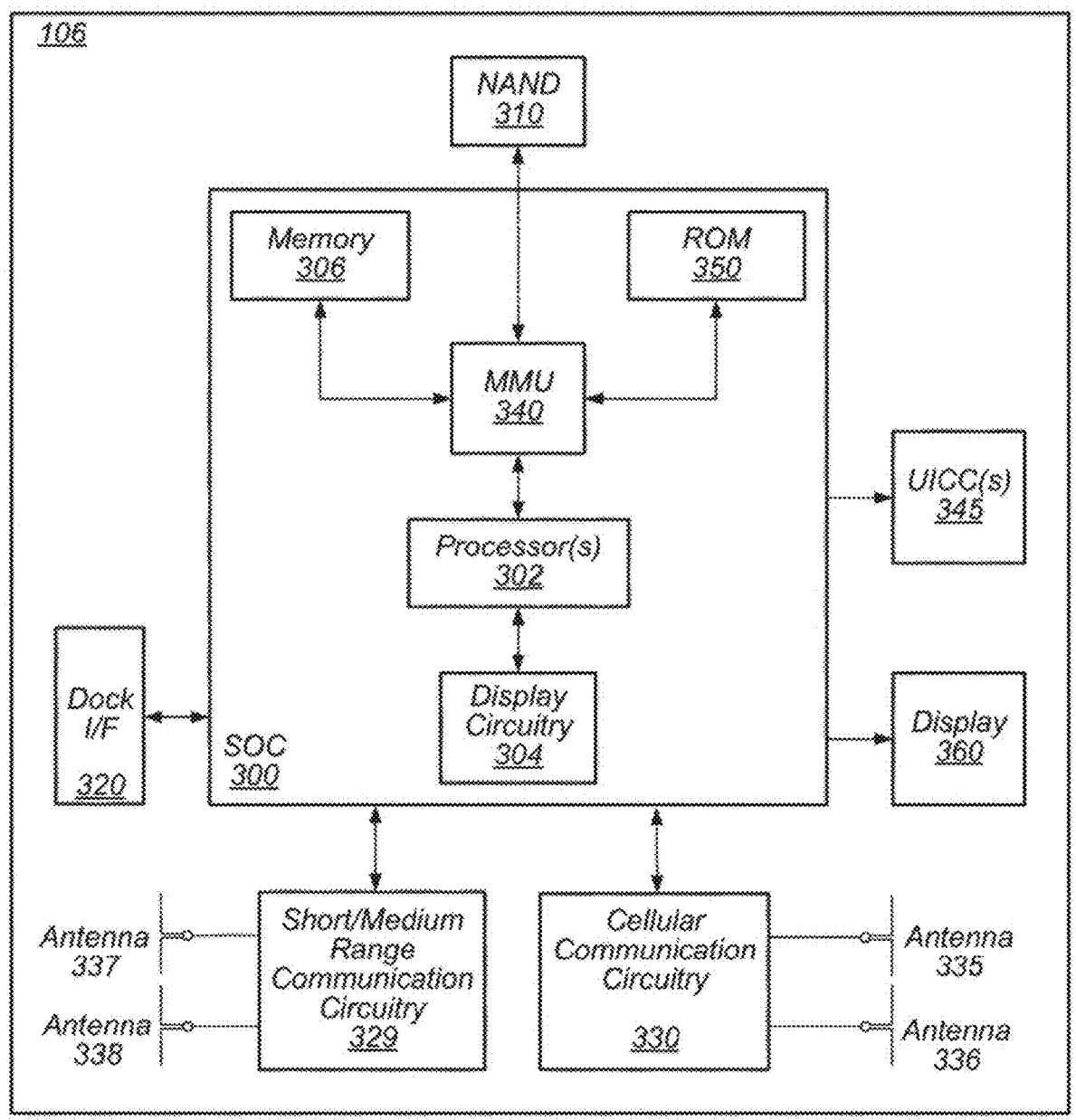
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
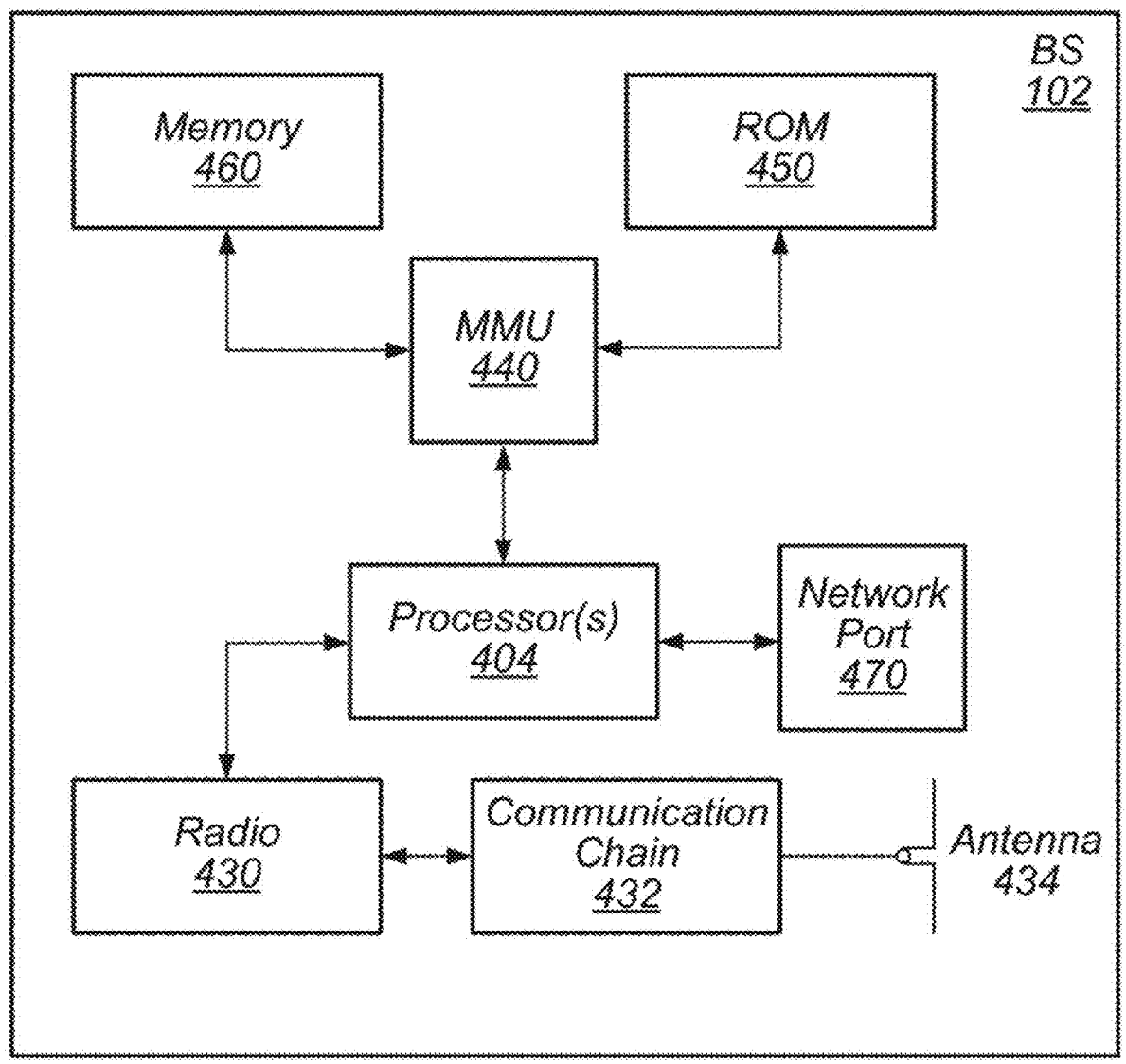
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
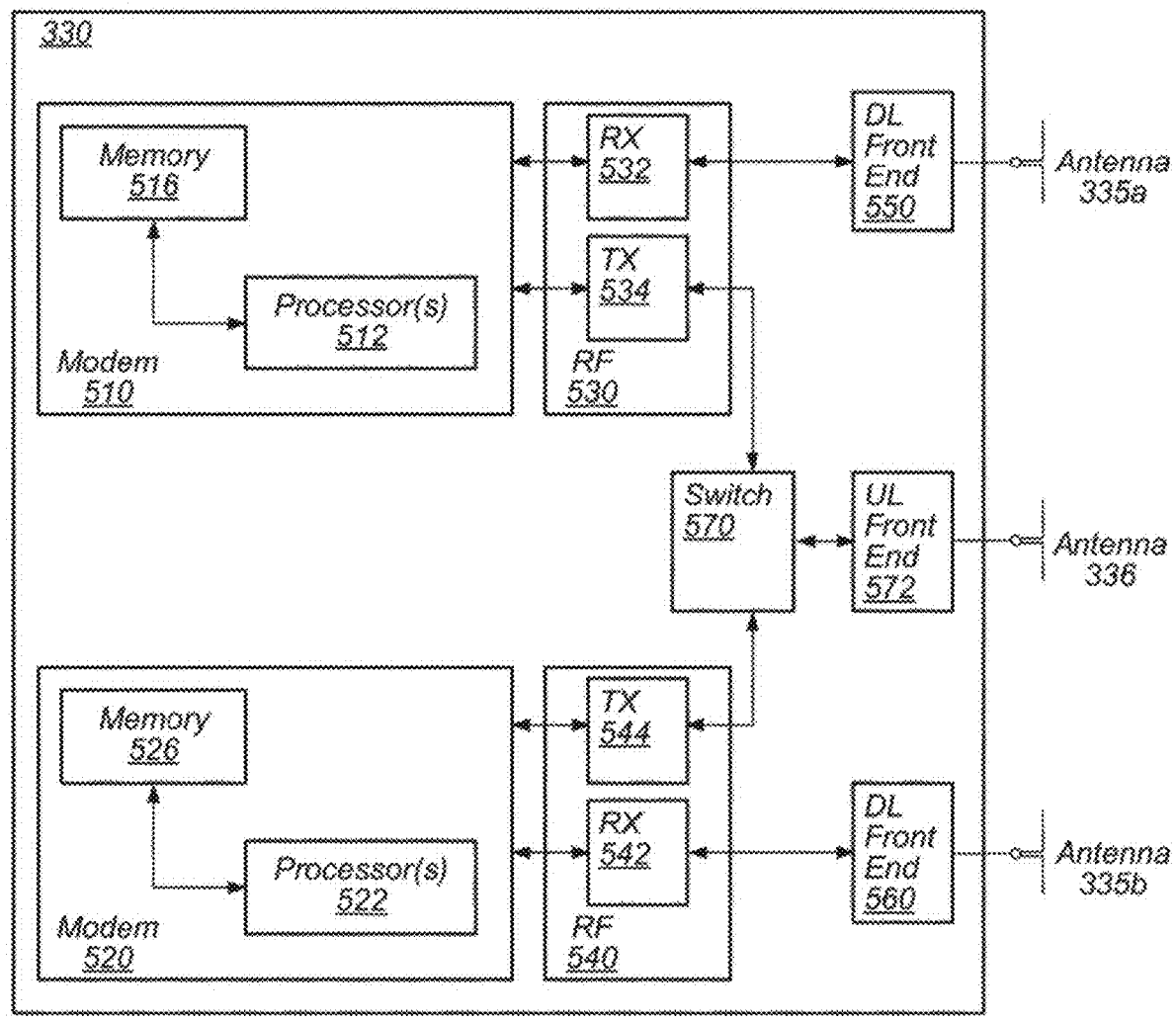
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Timing Relationships in NTN

In a Terrestrial Network (TN), the timing can be different as compared with an NTN. For example, for TN, in a Physical Downlink Shared Channel (PDSCH) reception timing, the Downlink Control Information (DCI) indicates a slot offset $K_0$, where the slot allocated for the PDSCH is $\lfloor n \cdot 2^{\mu_{PDSCH}}/2^{\mu_{PDCCH}} \rfloor + K_0$. In addition, for the DCI scheduled Physical Uplink Shared Channel (PUSCH) transmission timing, the DCI indicates the slot offset $K_2$, the slot allocated for PUSCH is $\lfloor n \cdot 2^{\mu_{PUSCH}}/2^{\mu_{PDCCH}} \rfloor + K_2$. In some embodiments, neither $K_0$ nor $K_2$ need a further offset in an NTN.

Furthermore, a Random Access Response (RAR) grant scheduled PUSCH transmission timing (e.g., Msg3), the RAR message ends in slot n, which is the slot allocated for PUSCH is $n+K_2+\Delta$, where the value for $\Delta$ can depend on $\mu_{PUSCH}$ (see Table 1 below).

TABLE 1

Mapping $\Delta$ to $\mu$PUSCH.

| $\mu$PUSCH | $\Delta$ |
| --- | --- |
| 0 | 2 |
| 1 | 3 |
| 2 | 4 |
| 3 | 6 |

Figure 6:
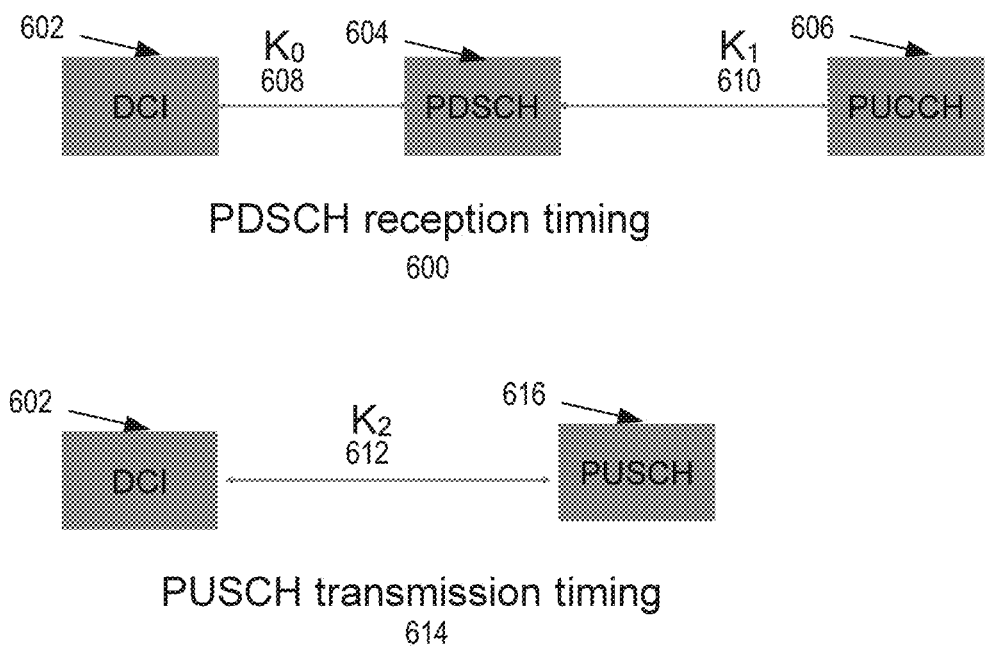
FIG. 6 is an illustration of some embodiments of reception and transmission timings.

Moreover, in a DCI scheduled PUCCH transmission timing, the DCI indicates the slot offset $K_1$. Thus, for a PDSCH reception at slot n, the slot allocated for PUCCH is $n+K_1$. FIG. 6 is an illustration of some embodiments of reception and transmission timings. In FIG. 6, the PDSCH reception timing 600 illustrates that $K_0$ 608 is the time gap between DCI 602 and PDSCH 604 and $K_1$ 610 is the time gap between PDSCH 604 reception and PUCCH 606 transmission. Furthermore, PUSCH transmission timing 614 illustrates that $K_2$ is the time gape between DCI 602 and PUSCH 616.

In addition, and in a TN system, for a Media access Control (MAC) Control Element (CE) action timing, the HARQ-ACK corresponding to a PDSCH carrying a MAC-CE command is sent in slot n. The corresponding action time is $n+3N_{slot}^{subframe,\mu}$, where $N_{slot}^{subframe,\mu}$ is the number of slots per subframe. Similar timing for aperiodic Sounding Reference Signal (SRS) transmission timing and CSI reference resource timing.

In a further embodiment, $K_0$ and $K_1$ are retrieved in the DCI Formats 1_0, 1_1, or 1_2, where $K_0$ is the time gap between DCI and PDSCH and $K_1$ is the time gap between PDSCH reception and PUCCH transmission. In some embodiments, in the DCI Format 1_0, $K_1$ is between 1 and 8 slots, in the DCI Format 1_1, $K_1$ is one of the values between 0 and 15 slots in PUCCH SCS ("dl-DataToUL-ACK" IE), and in DCI Format 1_2, $K_1$ is one of the values between 0 and 15 slots in PUCCH SCS ("dl-DataToUL-ACK-ForDCIFormat1_2" IE). Furthermore, the maximum gap between PDSCH reception and PUCCH transmission is 15 slots. In another embodiment, $K_2$ is retrieved in the DCI Format 0_0, 0_1, or 0_2, $K_2$ is the time gap between DCI and PUSCH. In some embodiments, in DCI Formats 0_0, 0_1, and 0_2, $K_2$ is one of the values between 0 and 32 slots in PUCCH SCS ("PUSCH-TimeDomainResourceAllocation" or "PUSCH-TimeDomainResourceAllocationNew" IE).

For timing in NTN systems, the timing relationships are different because of the longer delays involved in communicating data across a satellite based system. In some embodiments, In the NR Rel 16 NTN study, a timing relationship is achieved by introducing an offset $K_{offset}$, where the PUSCH timing is $$\left\lfloor n \cdot \frac{2^{\mu_{PUSCH}}}{2^{\mu_{PDCCH}}} \right\rfloor + K_2 + K_{offset}.$$

Here, $K_2$ is indicated by the DCI, and $\mu_{PUSCH}$ and $\mu_{PDCCH}$ are the sub-carrier spacing for PUSCH and PDCCH, respectively. In some embodiments, $K_{offset}$ is used to count the large propagation delay from satellite and $K_{offset}$ is in unit of slots. In this embodiment, the $K_{offset}$ is a round trip measurement of the propagation delay. In another embodiment, a similar offset applies to RAR grant scheduled PUSCH, PUCCH, SRS transmission. For example and in some embodiments, for the CSI reference resource timing, the Channel-State Information (CSI) reference resource for a CSI repot in uplink slot n' is given by a single downlink slot $n-n_{CSI_{ref}}-K_{offset}$, where $$n = \left\lfloor n' \frac{2^{\mu_{DL}}}{2^{\mu_{UL}}} \right\rfloor,$$

$\mu_{DL}$ and $\mu_{UL}$ are the sub-carrier spacing configurations for DL and UL, respectively and $n_{CSI_{ref}}$ depends on the type of CSI report. In addition, the MAC CE action timing is $n+3N_{slot}^{subframe,\mu}$, where n is HARQ-ACK time for PDSCH carrying a MAC CE command and $N_{slot}^{subframe,\mu}$ is the number of slots per subframe for sub-carrier spacing $\mu$. In some embodiments, while the MAC CE action timing is 3 microseconds for TN, this time can be larger in an NTN.

In some embodiments, in an NTN system, a challenge can be determining the time relationship based on a timing advance (TA). In some embodiments, timing advance means that, in an uplink transmission, a UE sends data earlier to compensate the propagation delay so that gNB receives the uplink data on time. For example and in some embodiments, the will be a need to calculate $K_{offset}$ and also a need to ensure a proper UL resource after the additional slot offset. In addition, for an NTN system that includes a UE with low capability of deriving the accurate differential TA, there is a challenge in ensuring that the PUCCH/PUSCH scheduled via $K_1$ and $K_2$, can be received at Next Generation NodeB (gNB) with proper timing. In some embodiments, a UE with high capability can derive an accurate differential TA, whereas a UE with low capability is unable to derive an accurate differential TA. In this embodiment, the existing $K_1$ and $K_2$ value ranges can be small and small $K_1$ and $K_2$ values may not be suitable for UEs with low capability of accurate differential TA acquisition. With the introduction of UE-specific time offset, the slot for uplink transmissions of PUSCH or PUCCH are not guaranteed to be uplink slot, with the existing range of $K_1$ and $K_2$. Thus, in some embodiments, a UE can extend the range of $K_1$ and $K_2$ for NTN. Furthermore, increasing $K_1$ and $K_2$ value ranges without increasing DCI signaling overhead can be useful. In addition, in NTN, the system may apply $K_{offset}$ to sidelink transmissions and configure the parameters in configured grant type 1 for NTN.

In a further embodiment, a scaling factor (S) for $K_4$ can be applied. In some embodiments, a possible scaling factor can be one of {1, 2, 4, 8, 16} or a different value. As with the scaling factor for $K_1$ or $K_2$ or $K_4$, the value of the scaling factor can depend on cell/beam size and/or depend on UE capability. In some embodiments, the network would configure and/or select a single scaling factor value for each UE. In a further embodiment, the network (e.g., a base station) would signal the scaling factor to the UE. For example and in some embodiments, the signaling can be a dedicated RRC signaling, e.g., "SL-ConfigDedicatedNR-r16". In another embodiment, the actual time gap between PDSCH reception and PUCCH transmission can be $S \cdot K_1$ slots.

Figure 7:
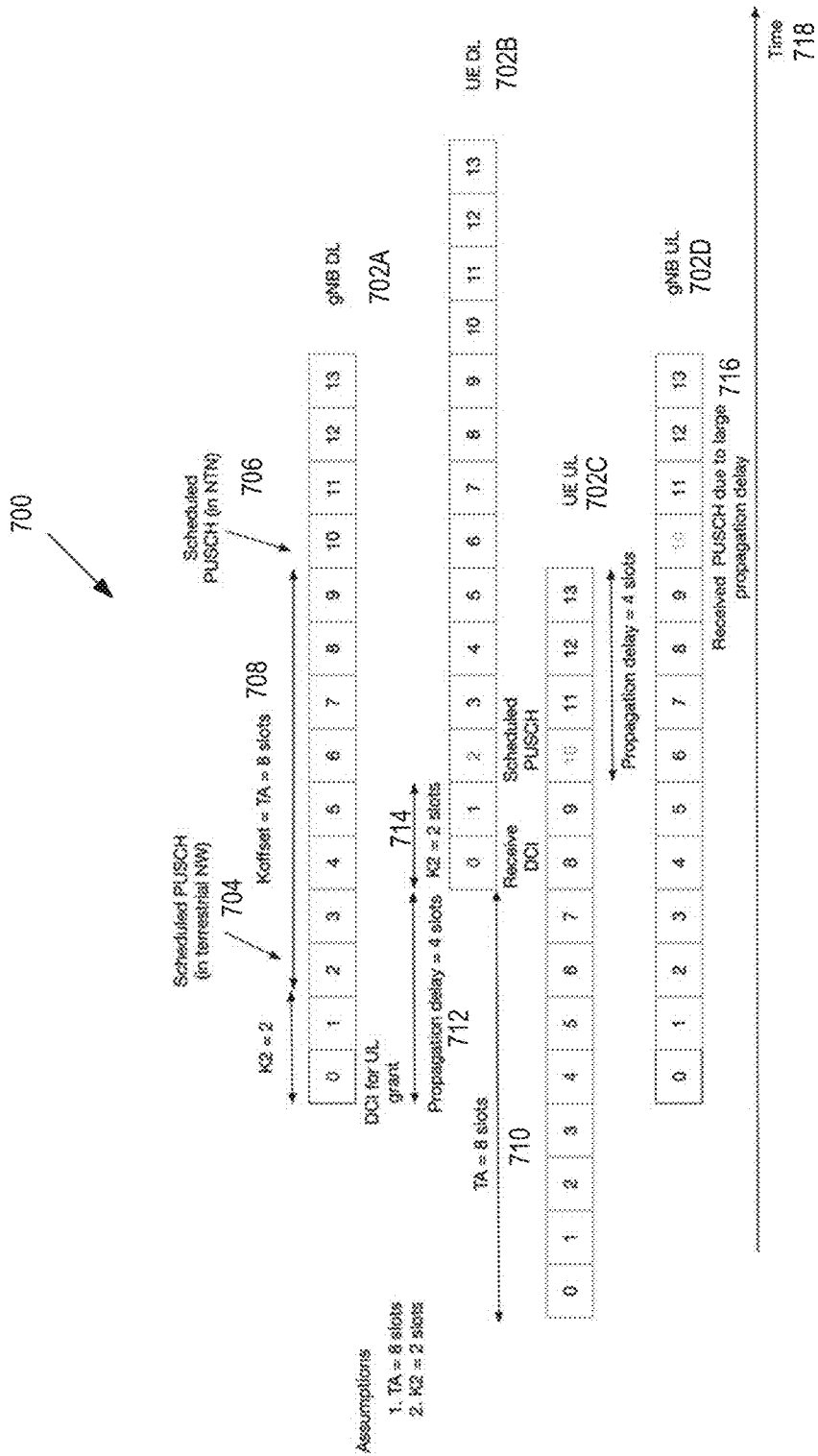
FIG. 7 is an illustration of some embodiments of NTN timing relationships.

FIG. 7 is an illustration of some embodiments of NTN timing relationships 700. In FIG. 7, the timing relationships includes slot timings 702A-D. In some embodiments, the gNB DL 702A includes a scheduled PUSCH 704 for a TN, which is shifted for NTN with $K_{offset}$ 708 to an NTN scheduled PUSCH 706. In addition, the UL DL 702B starts after a TA 710. At slot 0 of the UE DL 702B, the DCI is received and the scheduled PUSCH starts after a delay of 2 slots from $K_2$. The UE UL 702C has a propagation delay of four slots from slot 10 to slot 13. Furthermore, the gNB UL 702D as the received PUSCH at slot 10 due to a large propagation delay 716.

Figure 8A:
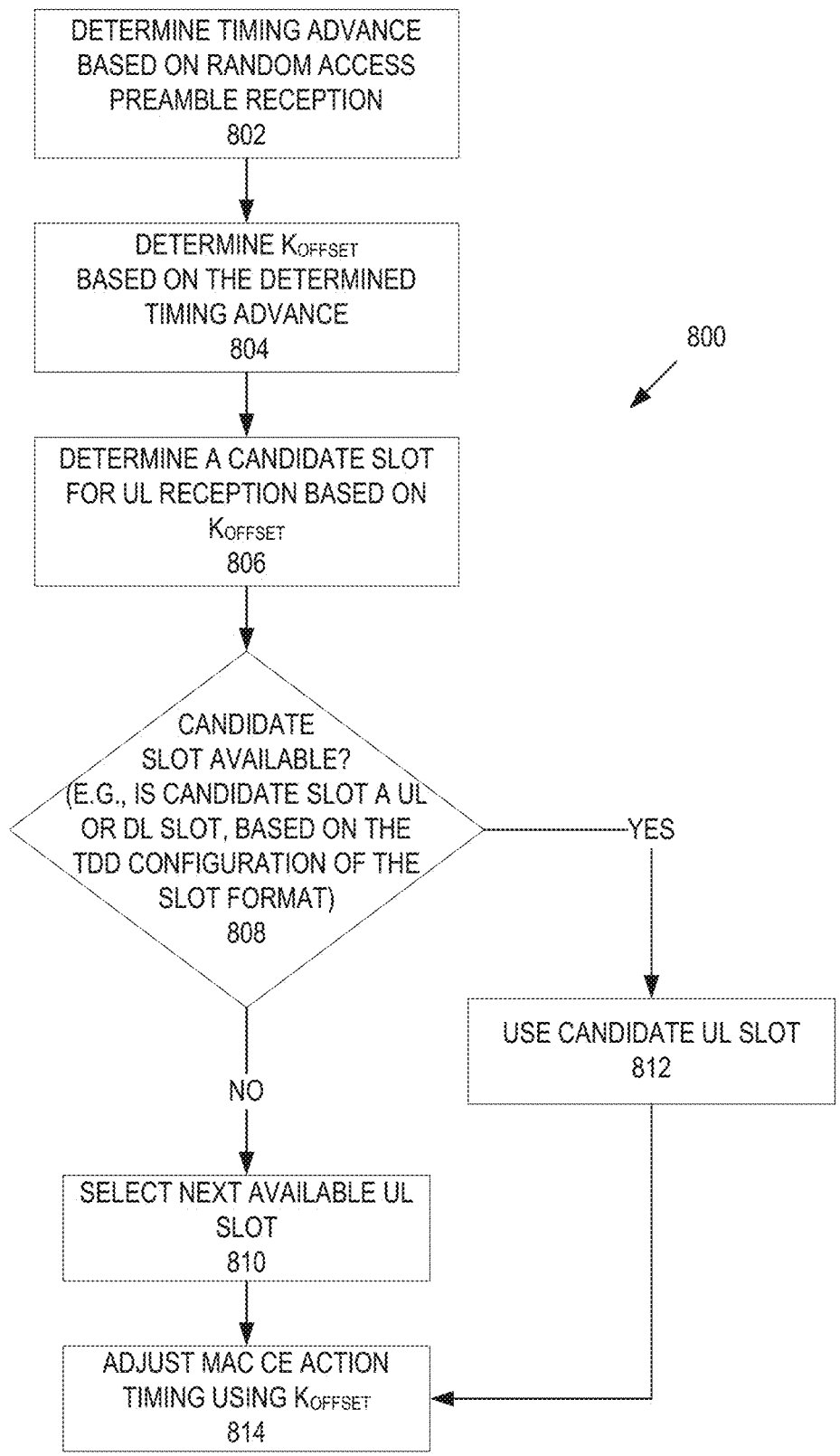
FIG. 8A-B are flow diagrams of some embodiments of a process to determine $K_{offset}$ and use $K_{outset}$ for determining different timings.

In some embodiments, an additional time offset $K_{offset}$ is introduced for NTN, where this time offset is in unit of slots. In addition, this time offset is on top of the existing timing of UE transmission types (e.g. DCI scheduled PUSCH, RAR scheduled PUSCH, PUCCH, MAC CE action timing, aperiodic SRS, as well as the CRI-RS reference resource). FIG. 8AB are flow diagrams of some embodiments of a process to determine $K_{offset}$ and use $K_{offset}$ for determining different timings for UL and DL.

In some embodiments, a base station performs process 800 as illustrated in FIG. 8A. In FIG. 8A, process 800 determines the timing advance based on a random access preamble reception at block 802. In one embodiment, process 800 collects the information that is used for calculating $K_{offset}$. In this embodiment, $K_{offset}$ is derived from timing advance (TA). The base station can calculate TA from the received PRACH. At block 804, process 800 determines $K_{offset}$ based on the determined TA. In some embodiments, the determination of $K_{offset}$ is based on the type of NTN architecture. In some embodiments, the time offset $K_{offset}$ is calculated based on the summation of service link full TA and feeder link TA for transparent satellite, where the gNB is on the ground. For example and in some embodiments, when the gNB is on the ground, $$K_{offset} = \left\lceil \frac{TA_{service\ link} + TA_{feeder\ link}}{slot\ duration} \right\rceil,$$

where $TA_{servicelink}$ is the full TA that is the summation of the common TA and the differential TA. In another example, when the gNB is on the satellite, the time offset is $$K_{offset} = \left\lceil \frac{TA_{servicelink}}{slot\ duration} \right\rceil,$$

where $TA_{servicelink}$ is the full service link TA. In another embodiment, for different satellite systems, $K_{offset}$ may be calculated differently.

Process 800 determines a candidate slot for a UL reception based on the $K_{offset}$ at block 806. In some embodiments, the candidate slot for a UL reception is based on a PUSCH timing that is calculated using the equation $$\left\lfloor n \cdot \frac{2^{\mu_{PUSCH}}}{2^{\mu_{PDCCH}}} \right\rfloor + K_2 + K_{offset}.$$

In addition, or instead at block 806, and in some embodiments, process 800 can determine PUCCH or SRS timing using $K_{offset}$. In this embodiment, process 800 applies $K_{offset}$ for PUCCH and/or SRS timing (e.g., adding $K_{offset}$ to a TN computation for PUCCH and/or SRS timing values). At block 808, process 800 determines if there is a candidate slot available. In some embodiments, process 800 determines the candidate slot is available based on a Time Division Duplex (TDD) configuration of the candidate slot format. For example and in one embodiment, process 800 determines if the candidate slot is an uplink slot, a downlink slot, a hybrid slot or a flexible slot based on at least the TDD configuration of the candidate slot format. If the candidate slot is one of an uplink slot or a hybrid slot with the uplink reception corresponding to uplink symbols in the hybrid slot, the candidate slot is available. Alternatively, the candidate slot is unavailable when the candidate slot is one of a downlink slot, a hybrid slot with the uplink reception not corresponding to uplink symbols in the hybrid slot, or a flexible slot. If the candidate slot is available, execution proceeds to block 812 below, where process 800 selects the initially determined candidate slot as the UL slot and execution proceeds to block 814. If there is not a candidate slot that is available, execution proceeds to block 810, where process selects the next available candidate slot for the UL slot. In some embodiments, it is possible with the additional time offset, the corresponding candidate slot is not available. In this embodiment, process 800 selects the first available slot for UL transmissions after the indicated UL slot (including time offset). In some embodiments, the UL transmissions can be performed for a DCI scheduled PUSCH, RAR scheduled PUSCH, PUCCH, or aperiodic SRS, where the MAC CE action timing is not affected. Execution proceeds to block 814 below.

Process 800 further adjusts a MAC CE action timing using the $K_{offset}$ at block 814. In some embodiments, process 800 computes the MAC CE action timing using the equation $n+XN_{slot}^{subframe,\mu}+K_{offset}$. In this embodiment, X may be smaller than 3, depending on gNB capability. Alternatively, X may depend on $K_{offset}$, where the larger the $K_{offset}$, the smaller the X value. In addition, the sum $XN_{slot}^{subframe,\mu}+K_{offset}$ may be a constant or may be upper bounded by a constant. Furthermore, the X value may be broadcast by gNB (e.g., in SIB).

Figure 8B:
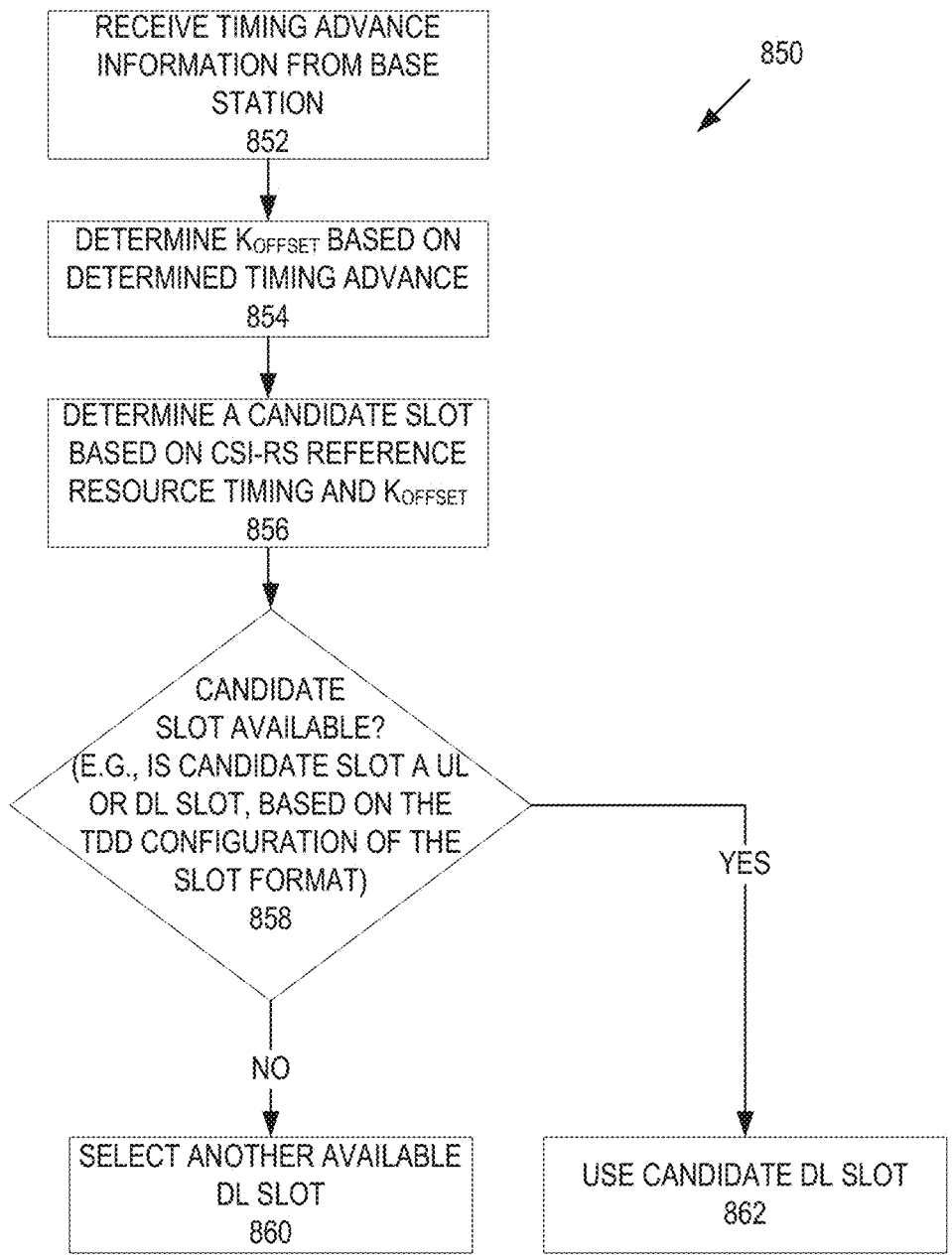

In FIG. 8B, process 850 is performed by a UE. FIG. 8B begins by process 850 receiving the timing advance information from the base station at block 852. In some embodiments, the determination of $K_{offset}$ is based on the type of NTN architecture. In some embodiments, process 850 collects information for calculating $K_{offset}$. In this embodiment, $K_{offset}$ is derived from the TA from a TA command in RAR (Random Access Response) messages from NW. At block 854, process 850 determines $K_{offset}$ based on the determined TA. In some embodiments, the time offset $K_{offset}$ is calculated based on the summation of service link full TA and feeder link TA for transparent satellite, where the gNB is on the ground. For example and in some embodiments, when the gNB is on the ground, $$K_{offset} = \left\lceil \frac{TA_{service\ link} + TA_{feeder\ link}}{slot\ duration} \right\rceil,$$

where $TA_{servicelink}$ is the full TA that is the summation of the common TA and the differential TA. In another example, when the gNB is on the satellite, the time offset is $$K_{offset} = \left\lceil \frac{TA_{servicelink}}{\text{slot duration}} \right\rceil,$$

where $TA_{servicelink}$ is the full service link TA. In another embodiment, for different satellite systems, $K_{offset}$ may be calculated differently.

Process 850 determines a candidate slot based on the CSI-RS reference resource timing and $K_{offset}$ at block 856. In some embodiments, the CSI reference resource timing, the CSI reference resource is given in the downlink slot as $n-n_{CSI_{ref}}-K_{offset}$, where n is time slot of CSI reporting and $n_{CSI_{ref}}$ depends on the type of CSI report. At block 858, process 850 determines if there is a candidate slot available. In some embodiments, process 850 determines the candidate slot is available based on a TDD configuration of the candidate slot format. For example and in one embodiment, process 850 determines if the candidate slot is an uplink slot, a downlink slot, a hybrid slot or a flexible slot based on at least the TDD configuration of the candidate slot format. If the candidate slot is one of a downlink slot or a hybrid slot with the downlink reception corresponding to downlink symbols in the hybrid slot, the candidate slot is available. Alternatively, the candidate slot is unavailable when the candidate slot is one of an uplink slot, a hybrid slot with the downlink reception not corresponding to downlink symbols in the hybrid slot, or a flexible slot. If there is a candidate slot available, execution proceeds to block 862 below, where process 850 uses the candidate slot. If there is not a candidate slot that is available, execution proceeds to block 860, where process 850 selects the another slot for the DL. In some embodiments, it is possible with the additional time offset, the corresponding DL slot is not available. In this embodiment, process 860 selects the previously available slot for DL transmissions before the indicated DL slot (including time offset). Alternatively, process 850 can select the next available slot as the DL slot.

Figure 9A:
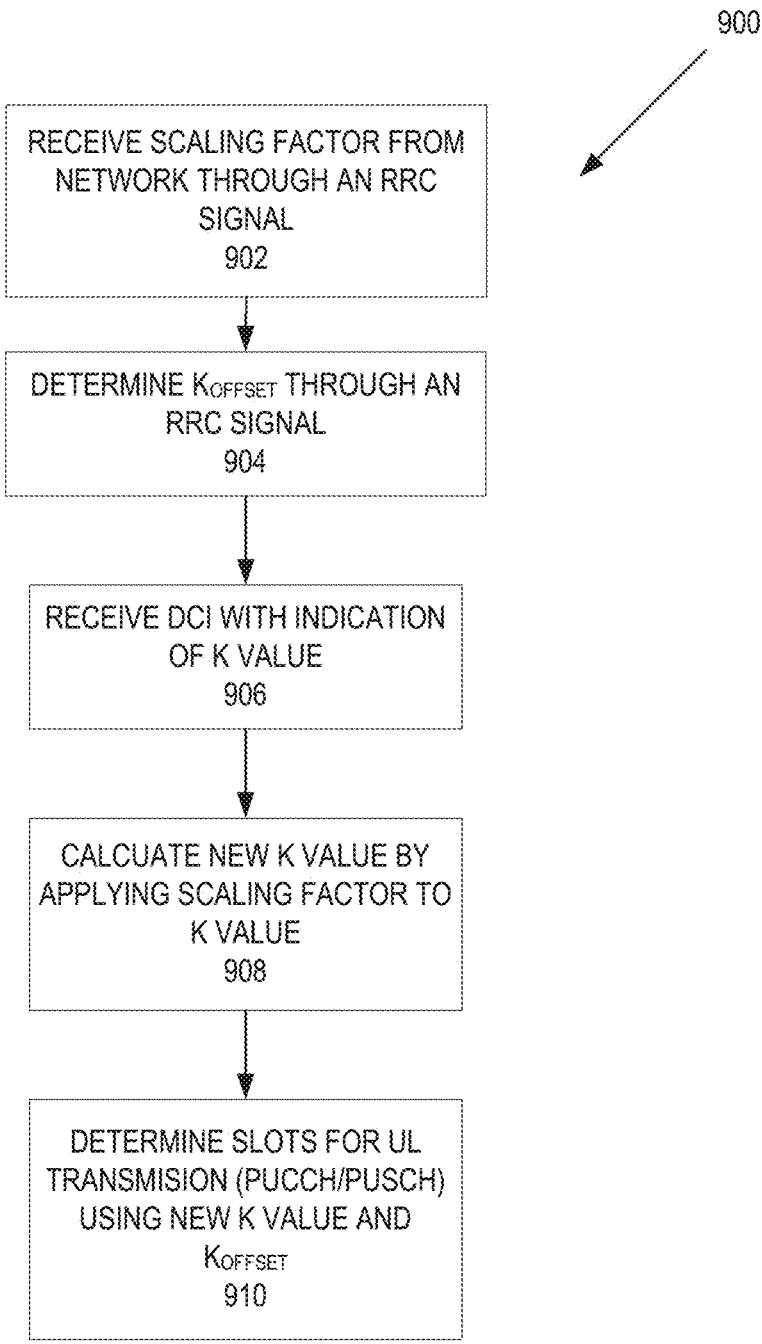
FIG. 9A-D are flow diagrams of some embodiments of a process to extend one or more time gaps between a downlink (DL) and an uplink (UL).

FIG. 9A-D are flow diagram of some embodiments of a process to extend one or more time gaps between a downlink (DL) and an uplink(UL). FIG. 9A is a flow diagram of some embodiments to determine a slot for UL transmission using a scaling factor and $K_{offset}$. In some embodiments, a UE performs process 900. In FIG. 9, process 900 begins by receiving a scaling factor for a K value through a Radio Resource Control (RRC) signal at block 902. In some embodiments, the scaling factor can be for one or more of $K_1$, $K_2$, or $K_4$. In some embodiments, existing $K_1$, $K_2$ values can independently range from 0-15 slots ($K_1$) or 0-32 slots ($K_2$). In some embodiments, the scaling factor is one of {1, 2, 4, 8, 16}, although the scaling factors may include different values. For example and in some embodiments, NTN can have large cell size and/or a large differential TA values. In this example, inaccurate differential TA values can be due to a UE's capability deriving accurate or inaccurate differential TA. In some embodiments, the values of the scaling factor(s) can depend on cell and/or beam size. For example and in some embodiments, the larger the cell size, the larger the scaling factor values. In addition, there can be a single scaling factor value for each UE, or there can be different scaling factors for different K values. In addition, the selected scaling factor can depend on UE capability. For example and in some embodiments, for a high capable UE, the scaling configuration is not needed, or configured scaling factor can be 1. Alternatively, for a low capable UE, the configuration can include a single scaling factor that is larger than 1.

At block 904, process 900 determines $K_{offset}$ through an RRC signal. In some embodiments, process 900 receives $K_{offset}$ by signaling from the network via a dedicated RRC signal, which can be the same or different RRC signal as the RRC signal used to communicate the scaling factor. At block 906, process 900 receives DCI with an indication of a K value. In this embodiment, the DCI includes an indication of which of the K values (e.g., $K_1$, $K_2$, or $K_4$) is to be scaled with the scaling factor. Process 900 calculates a new K value using the scaling factor and the indicated K value at block 908. In some embodiments, process 900 calculates the new K value by multiplying the existing K value by the scaling factor, S. For example and in one embodiment, if the K value is $K_1$, process 900 calculates a $K_1=S*K_1$. New K values can be computed similarly for $K_2$ and/or $K_4$. At block 910, process determines a slot for UL transmission using the new K value and $K_{offset}$.

Figure 9B:
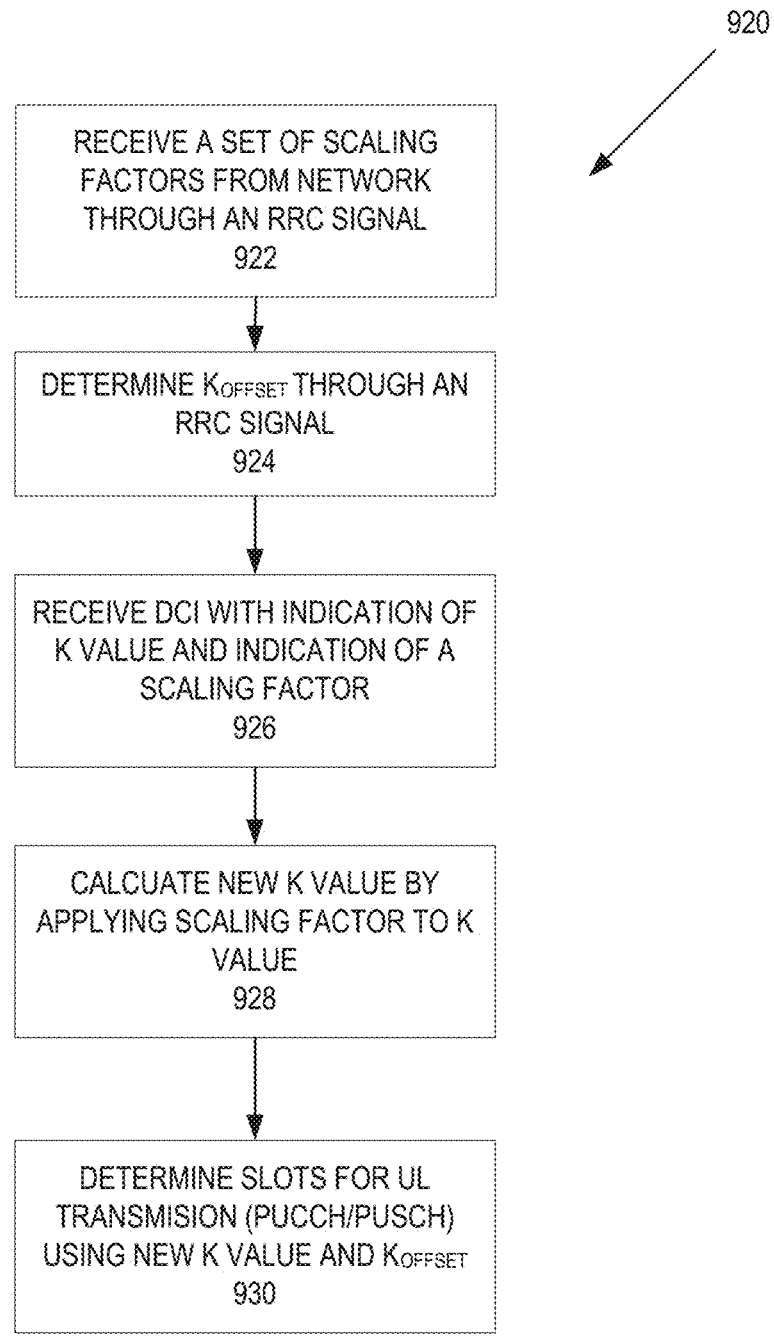

In FIG. 9A, process 900 applies a scaling factor that is sent using an RRC message. In alternate embodiments, the scaling factor applied can be more dynamic where the scaling factor is communicated to the UE through DCI and not just through a RRC signal. FIG. 9B is a flow diagram of some embodiments to determine a slot for UL transmission using a scaling factor and $K_{offset}$, where the indicated scaling factor is communicated through DCI. In some embodiments, a UE performs process 920. In FIG. 9B, process 920 begins by receiving a scaling factor set for a K value through a Radio Resource Control (RRC) signal at block 922. In some embodiments, the scaling factor set can be used for one or more of $K_1$, $K_2$, or $K_4$. In some embodiments, existing $K_1$, $K_2$ values can independently range from 0-15 slots ($K_1$) or 0-32 slots ($K_2$). In some embodiments, the scaling factor set can be the set of scaling factors, such as {1, 2, 4, 8, 16}, although the scaling factor set may include different values. At block 924, process 920 determines $K_{offset}$ through an RRC signal. In some embodiments, process 920 receives $K_{offset}$ by signaling from the network via a dedicated RRC signal, which can be the same or different RRC signal as the RRC signal used to communicate the scaling factor.

At block 926, process 920 receives DCI with an indication of a K value and scaling factor. In some embodiments, the DCI includes an indication of which of the K values (e.g., $K_1$, $K_2$, or $K_4$) is to be scaled with the scaling factor. In addition, the DCI can include an indication of which scaling factor to use with this K value, where the scaling factor is selected from the scaling factor set sent to the UE as described in block 922 above. There can be different scaling factors for different K values and/or different UEs. For example and in some embodiments, NTN can have large cell size and/or a large differential TA values. In this example, inaccurate differential TA values can be due to a UE's capability deriving accurate or inaccurate differential TA. In some embodiments, the values of the scaling factor(s) for the scaling factor set can depend on cell and/or beam size. For example and in some embodiments, the larger the cell size, the larger the scaling factor values. In addition, the selected scaling factor can depend on UE capability. For example and in some embodiments, for a high capable UE, the scaling configuration is not needed, or configured scaling factor can be 1. Alternatively, for a low capable UE, the configuration can include a single scaling factor that is larger than 1.

Process 920 calculates a new K value using the indicated scaling factor and the indicated K value at block 928. In some embodiments, process 920 calculates the new K value by multiplying the existing K value by the scaling factor, S. For example and in one embodiment, if the K value is $K_1$, process 920 calculates a $K_1=S*K_1$. New K values can be computed similarly for $K_2$ and/or $K_4$. At block 930, process determines a slot for UL transmission using the new K value and $K_{offset}$.

Figure 9C:
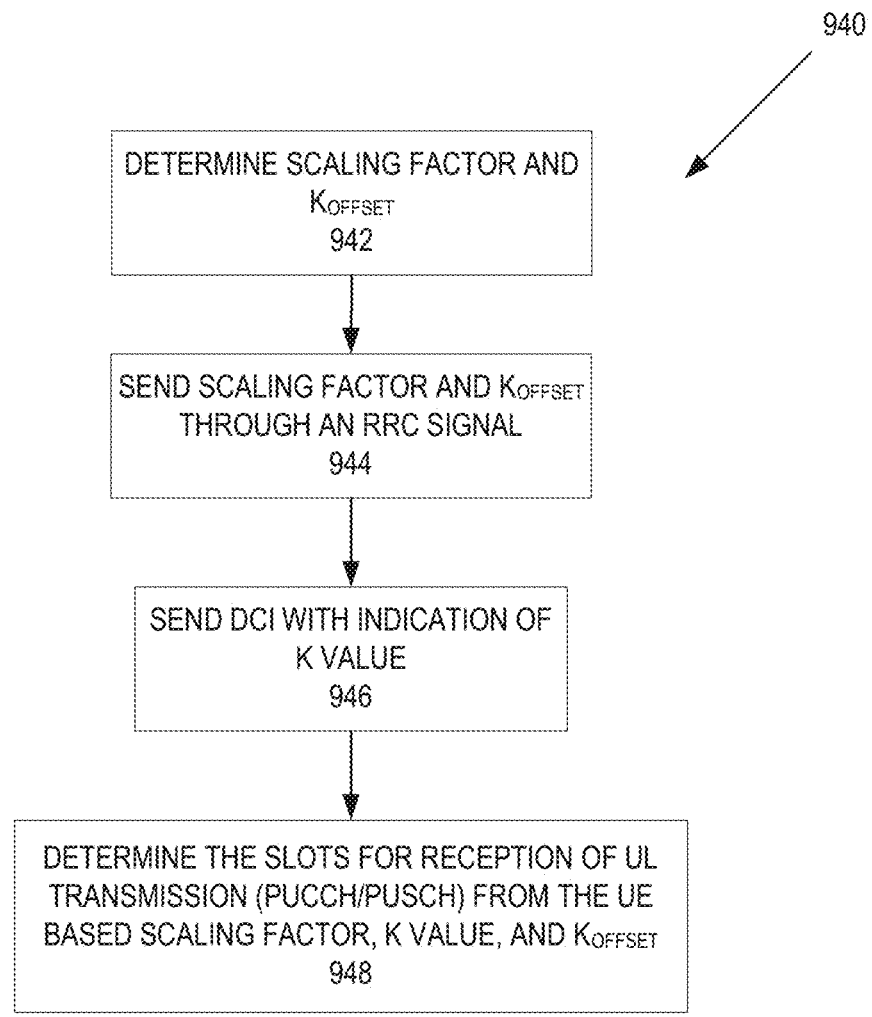

In FIG. 9AB, processes 900 and 920 represented UE processes that determine a UL slot based on information sent to the UE from a base station. On a base station, corresponding processes determine the UL sot information for a reception of the UL communication. FIG. 9C is a flow diagram of some embodiments to determine a slot for UL transmission for a base station using a scaling factor and $K_{offset}$. In some embodiments, a base station performs process 940. In FIG. 9C, process 940 begins by determining a scaling factor and $K_{offset}$ for a UE at block 942. In some embodiment, process 940 determines the scaling factor based on the NTN characteristics and the UE characteristics as described in FIG. 9A above. At block 944, process 940 sends the scaling factor and $K_{offset}$ to the UE through one or more RRC signals. In some embodiments, process 940 can send the scaling factor and $K_{offset}$ in the same or different RRC signals.

Process 940 sends DCI with an indication of the K value at block 946. In some embodiments, process 940 selects which K value to choose for scaling. In some embodiments, which K values is included depends on the DCI format. For example and in one embodiment, when the base station sends a DCI with a DCI Format for DL scheduling, the DCI will include K1. For UL scheduling, the DCI Format may include $K_2$. In these embodiments, process 940 selects one or more of $K_1$, $K_2$, or $K_4$ to indicate in the DCI. At block 948, process 940 determines the slots for reception of the UL transmission from the UE based on at least the scaling factor, K value, and/or $K_{offset}$. In one embodiment, the determination of the UL slot depends on the type of UL transmission (e.g., PUCCH, PUSCH, and/or another type of UL transmission. For example and in one embodiment, for a PUCCH, the UL slot is determined using the formula n+$K_1$', where $K_1$' is the scaled value of $K_1$. Alternatively for PUSCH, the UL slot is determined using the formula, $$\left\lfloor n \cdot \frac{2^{\mu PUSCH}}{2^{\mu PDCCH}} \right\rfloor + K_2' + K_{offset},$$

where $K_2$' is the scaled value of $K_2$ is the value as indicated above. Similarly, the time gap between PSFCH and PUCCH is $K_4$'+$K_{offset}$, where $K_4$' is the scaled value of $K_4$.

Figure 9D:
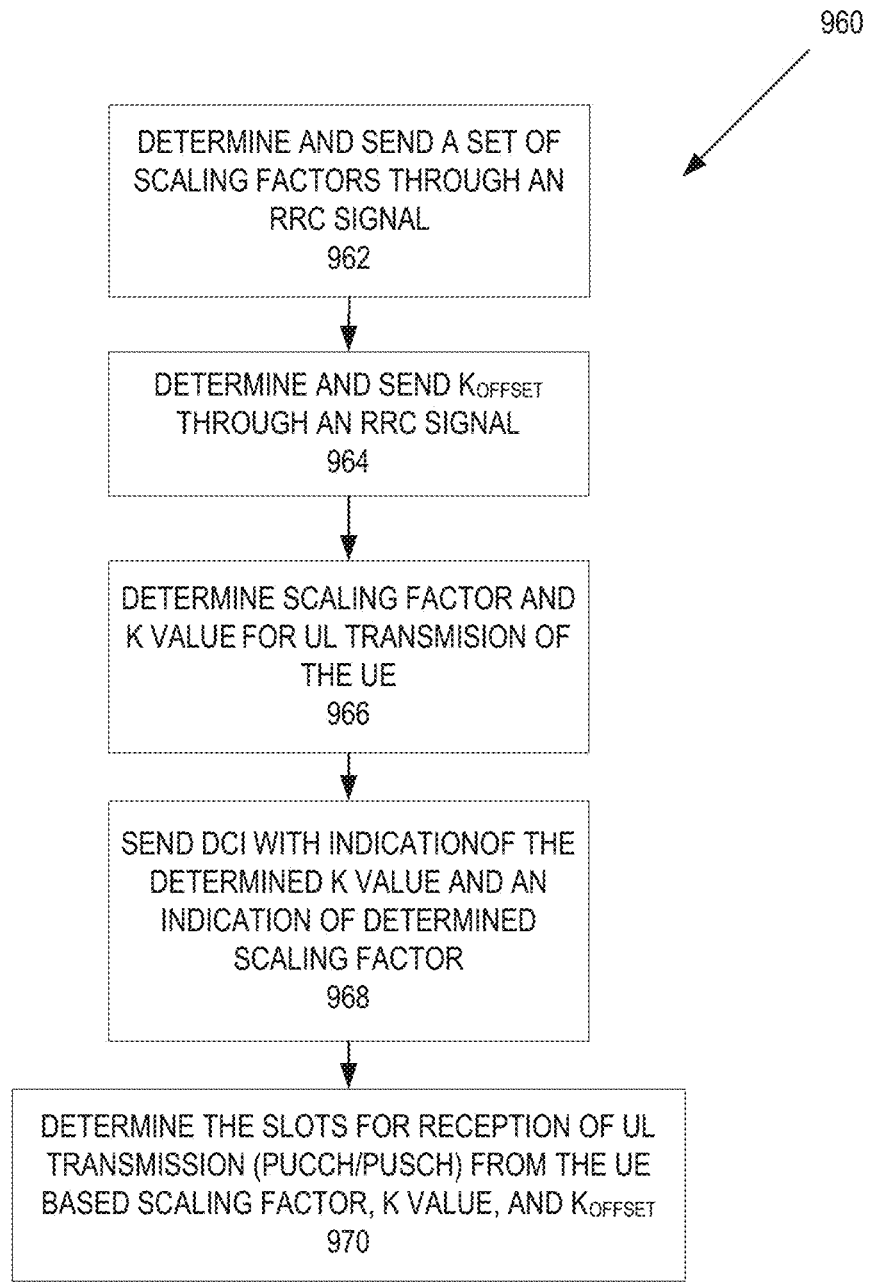

In FIG. 9B above, the UE receives a set of scaling factors and which factor to use by the UE is indicated in DCI sent from the base station. FIG. 9D is a flow diagram of some embodiments to determine a slot for UL transmission for a base station using a scaling factor and $K_{offset}$, where the indicated scaling factor is communicated through DCI. In some embodiments, the base station perform process 960. In FIG. 9D, process 960 begins by determining and sending a set of scaling factors to the UE from the base station through an RRC signal at block 962. In some embodiments, the scaling factor set can be used for one or more of $K_1$, $K_2$, or $K_4$. In some embodiments, existing $K_1$, $K_2$ values can independently range from 0-15 slots ($K_1$) or 0-32 slots ($K_2$). In some embodiments, the scaling factor set can be the set of scaling factors, such as {1, 2, 4, 8, 16}, although the scaling factor set may include different values.

At block 964, process 960 determines and sends $K_{offset}$ to the UE through an RRC signal. In some embodiments, process 960 determines the value of $K_{offset}$ based on the type of NTN architecture as described above in FIG. 8A. In some embodiments, process 960 sends $K_{offset}$ by signaling from the network via a dedicated RRC signal, which can be the same or different RRC signal as the RRC signal used to communicate the scaling factor. Process 960 determines a scaling factor and K value for the UL transmission of the UE at block 966. In some embodiments, process 960 selects which K value to choose for scaling. Which K value is included in the DCI depends on the DCI formatting as described in FIG. 9A above. n these embodiments, process 960 selects one or more of $K_1$, $K_2$, or $K_4$ to indicate in the DCI. In addition, the scaling factor is selected from the scaling factor set and can be tailored for the determined K value and/or receiving UE. Process 960 sends an indication of the K value and determined scaling factor at block 968. At block 970, process 960 determines the slots for reception of the UL transmission from the UE based on at least the scaling factor, K value, and/or $K_{offset}$. In one embodiment, the determination of the UL slot depends on the type of UL transmission (e.g., PUCCH, PUSCH, and/or another type of UL transmission. For example and in one embodiment, for a PUCCH, the UL slot is determined using the formula n+$K_1$', where $K_1$' is the scaled value of $K_1$. Alternatively for PUSCH, the UL slot is determined using the formula, $$\left\lfloor n \cdot \frac{2^{\mu PUSCH}}{2^{\mu PDCCH}} \right\rfloor + K_2' + K_{offset},$$

where $K_2$' is the scaled value of $K_2$ is the value as indicated above. Similarly, the time gap between PSFCH and PUCCH is $K_4$'+$K_{offset}$, where $K_4$' is the scaled value of $K_4$.

Figure 10:
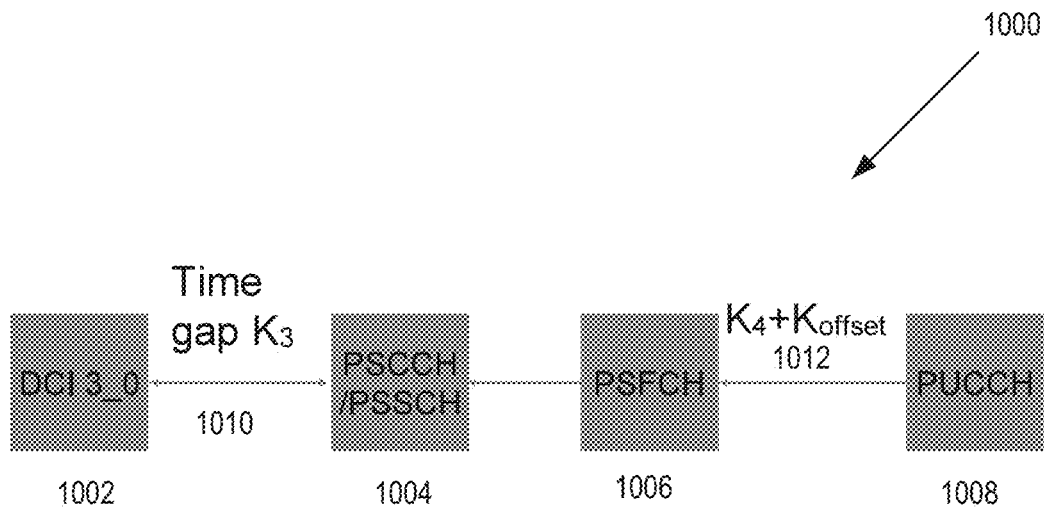
FIG. 10 illustrates an example block diagram of a timing relationship for a sidelink in NTN according to some embodiments.

In some embodiments, the DCI Format 3_0 includes time gaps $K_3$ and $K_4$, where the time gap $K_3$ is between DCI 3_0 reception to first PSCCH/PSSCH transmission and the time gap $K_4$ between last PSFCH reception and PUCCH transmission. In NTN, there may be no additional $K_{offset}$ on top of $K_3$, but $K_{offset}$ can be applied to $K_4$. FIG. 10 illustrates an example block diagram of a timing relationship 1000 for a sidelink in NTN according to some embodiments. In FIG. 10, the timing relationship indicates the time gaps between DCI 3_0 1002 and PSCCH/PSSCH 1004 and PSFCH 1006 and PUCCH 1008. In some embodiments, the time gap $K_3$ 1010 is not adjusted for NTN, as this time gap is sufficient for the gap between DCI 3_0 1002 and PSCCH/PSSCH 1004. Alternatively, the time gap $K_4$ 1012 between PSFCH 1006 and PUCCH 1008 is increased by $K_{offset}$ in NTN. In addition, $K_{offset}$ may be the same or different from that for PUSCH transmission in NTN.

Figure 11A:
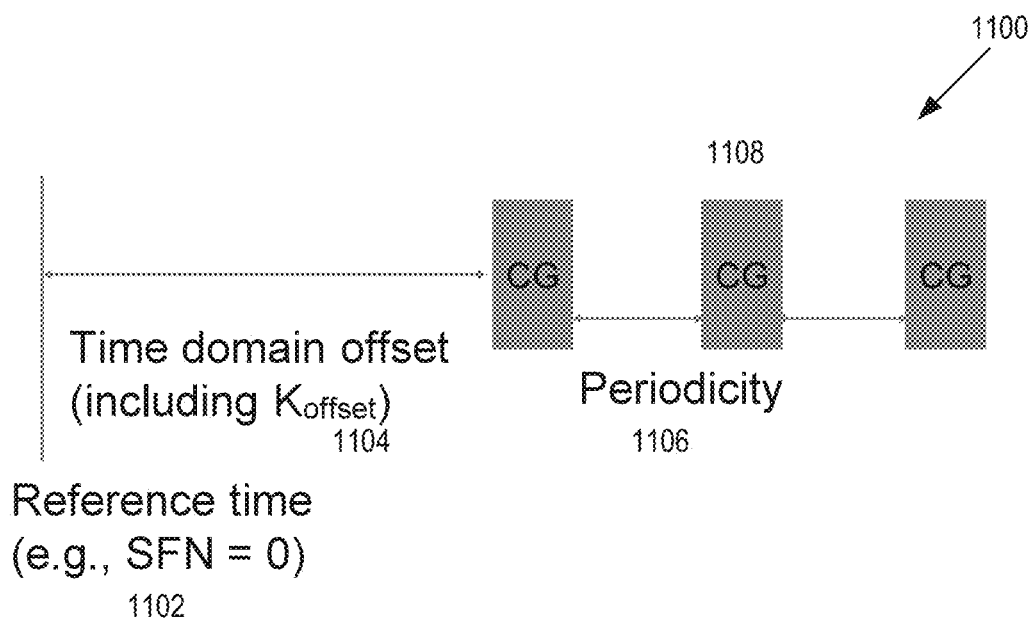
FIG. 11A-B illustrate an example block diagram of a timing relationship for a Type 1 Configured Grant Configuration in NTN.

In a further embodiment, the UE can use $K_{offset}$ in a timing relationship for Type 1 Configured Grant Configuration. FIG. 11AB illustrate an example block diagram of a timing relationship for a Type 1 Configured Grant Configuration in NTN. In FIG. 11A, the time domain offset 1104 can include $K_{offset}$, where the time domain offset is an offset from a reference time 1102 (e.g., SFN=0) to configured grants 1108. In some embodiments, the configured grants 1108 are separated by a periodicity value 1106. In some embodiments, $K_{offset}$ is included in the configured grant configuration. In another embodiment, A separate $K_{offset}$ parameter is in configured grant configuration. For example and in some embodiments, the following equation is used to determine the slot number for the configured grant, which includes $K_{offset}$:

[(*SFN*×numberOfSlotsPerFrame×numberOfSymbolsPerSlot)+(slot number in the frame×numberOfSymbolsPerSlot)+symbol number in the slot]=(timeReferenceSFN×numberOfSlotsPer- Frame×numberOfSymbolsPerSlot+timeDomain-Offset numberOfSymbolsPerSlot+$K_{offset}$×numberOfSymbolsPerSlot+S+N×periodicity) modulo (1024×numberOfSlotsPerFrame×numberOfSymbolsPerSlot).

In a further embodiment, the network combines $K_{offset}$ into "TimeDomainOffset" in configured grant configuration. For example and in some embodiments, for the "timeDomainOffset" range, the lower bound depends on satellite type (e.g., LEO, GEO, HAPS). For example and in some embodiments, in type 1 configured grant configuration, there is a field of "timeDomainOffset" to indicate the time gap between the configured grant time and the reference time (e.g., SFN=0). The time gap may be larger for NTN so as to include the $K_{offset}$.

Figure 11B:
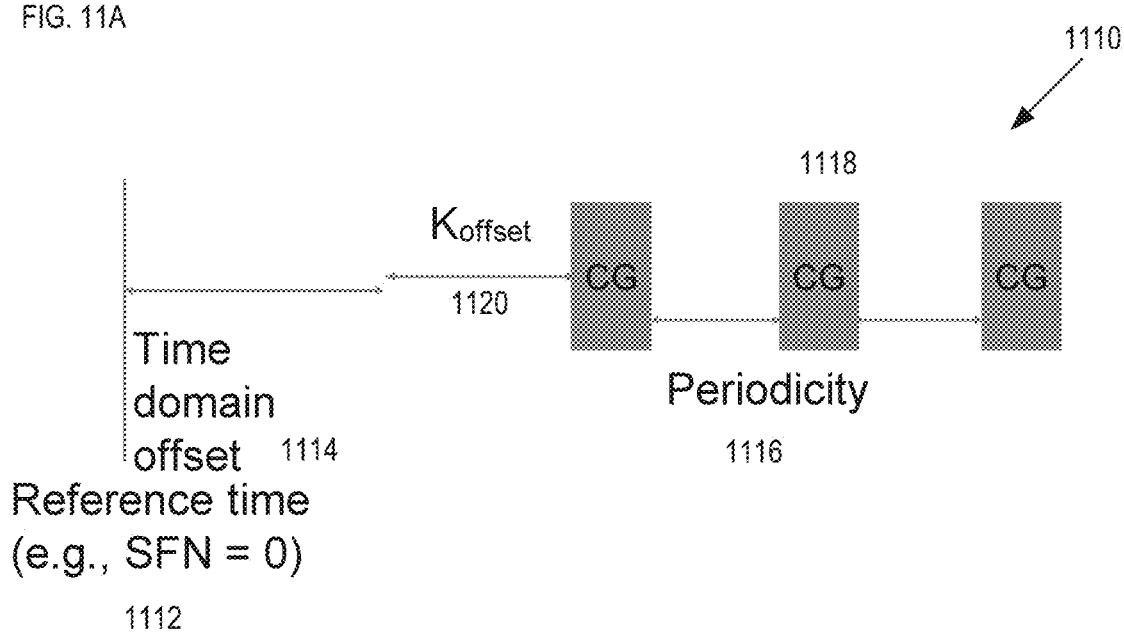

In another embodiment, the network can include $K_{offset}$ in each transmission. In FIG. 11B, the time domain offset 1112 can include $K_{offset}$ as a separate value in each transmission, where the time domain offset is an offset from a reference time 1114 (e.g., SFN=0), when added to $K_{offset}$ 1120, to configured grants 1118. In some embodiments, the configured grants 1118 are separated by a periodicity value 1116.

Figure 12:
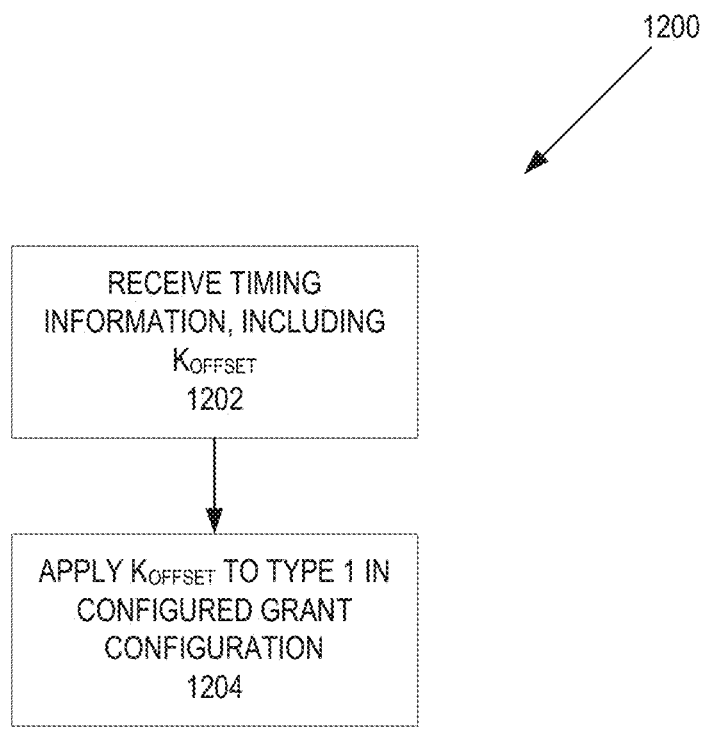
FIG. 12 is a flow diagram of some embodiments of a process to determine and apply a scaling to $K_4$.

FIG. 12 is a flow diagram of some embodiments of a process 1300 to determine and apply a scaling to $K_{offset}$ for a Type 1 configure grant configuration. In some embodiments, a UE performs process 1200. In FIG. 13, process 1200 receives the timing information, where the timing information does not include $K_{offset}$ at block 1202. In some embodiments, process 1200 receives $K_{offset}$ by signaling from the network via a dedicated RRC message. Process 1200 applies $K_{offset}$ to the Type 1 Configured Grant Configuration as described in FIG. 11B at block 1204.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "sending," "receiving," "detecting," "determining," "communicating," "transmitting," "assigning", "ranking," "decrementing," "selecting," "applying," "signaling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A base station comprising a processor configured to perform the operations comprising:
   determining a timing advance based on at least a random access preamble reception;
   determining an uplink offset based on the timing advance, wherein the uplink offset is set equal to a sum of a service link time advance and a feeder link time advance, divided by a slot duration;
   determining a candidate slot for an uplink reception based on at least the offset;
   determining if the candidate slot is available for the uplink reception;
   using the candidate slot for the uplink reception when the candidate uplink slot is available; and
   using the next available slot for the uplink reception when the candidate uplink slot is not available.

2. The base station of claim 1, wherein the uplink reception comprises a Physical Uplink Shared Channel (PUSCH), Random Access Response (RAR) scheduled by PUSCH, Physical Uplink Control Channel (PUCCH), or aperiodic SRS.

3. The base station of claim 1, wherein the determining if the candidate slot is available comprises:
   determining if the candidate slot is an uplink slot, a downlink slot, a hybrid slot or a flexible slot based on at least the Time Division Duplex (TDD) configuration of the candidate slot format, wherein the candidate slot is available when the candidate slot is one of an uplink slot or a hybrid slot with the uplink reception corresponding to uplink symbols in the hybrid slot and the candidate slot is unavailable when the candidate slot is one of a downlink slot, a hybrid slot with the uplink reception not corresponding to uplink symbols in the hybrid slot, or a flexible slot.

4. The base station of claim 1, wherein the uplink offset is a measure of a delay of a non-terrestrial network link.

5. The base station of claim 1, wherein the determining of the uplink offset comprises:
   computing the uplink offset based on at least a time advance of one or more satellite links in a non-terrestrial network.

6. The base station of claim 1, wherein the processor is further configured to perform the operation:
   computing a Medium Access Control (MAC) Control Element (CE) action timing using at least the uplink offset.

7. The base station of claim 1, wherein the processor is further configured to perform the operation:
   computing a time gap between a last Physical Sidelink Feedback Channel (PSFCH) reception and Physical Uplink Control Channel (PUCCH) transmission using a sidelink offset.

8. The base station of claim 7, wherein the sidelink offset has a different value than the uplink offset.

9. The base station of claim 1, wherein the processor is further configured to perform the operation:
   computing a time domain offset for a type 1 configured grant configuration using at least the uplink offset.

10. A user equipment (UE) comprising a processor configured to perform the operations comprising:
    receiving, from a base station, timing advance information;
    determining an offset based on the timing advance information, wherein the offset is set equal to a sum of a service link time advance and a feeder link time advance, divided by a slot duration;
    determining a candidate slot for a Channel State Information (CSI) reference resource based on at least the offset;
    determining if the candidate slot is available for the CSI reference resource;
    using the candidate slot for the CSI reference resource when the candidate slot is available; and
    using another slot for the CSI reference resource when the candidate slot is not available.

11. The UE of claim 10, wherein the determining comprises:
    determining if the candidate slot is an uplink slot, a downlink slot, a hybrid slot or a flexible slot based on at least the Time Division Duplex (TDD) configuration of the candidate slot format, wherein the candidate slot is available if the candidate slot is one of a downlink slot or a hybrid slot with the downlink reception corresponding to downlink symbols in the hybrid slot and the candidate slot is unavailable if the candidate slot is one of an uplink slot, a hybrid slot with the downlink reception not corresponding to downlink symbols in the hybrid slot, or a flexible slot.

12. The UE of claim 10, wherein the offset is a measure of a delay of a non-terrestrial network link.

13. The UE of claim 10, wherein the another available CSI reference resource is a previous slot of the candidate slot.

14. The UE of claim 10, wherein the another available CSI reference resource is a next slot of the candidate slot.

15. A baseband processor configured to perform operations comprising:
    receiving, from a base station, timing advance information;
    determining an offset based on the timing advance information, wherein the offset is set equal to a sum of a service link time advance and a feeder link time advance, divided by a slot duration;
    determining a candidate slot for a Channel State Information CSI reference resource based on at least the offset;
    determining if the candidate slot is available;
    using the candidate slot for the CSI reference resource when the candidate slot is available; and
    using the another slot for the CSI reference resource when the candidate slot is not available.

16. The baseband processor of claim 15, wherein the determining comprises:
    determining if the candidate slot is an uplink slot, a downlink slot, a hybrid slot or a flexible slot based on at least the Time Division Duplex (TDD) configuration of the candidate slot format, wherein the candidate slot is available when the candidate slot is one of an uplink slot or a hybrid slot and the candidate slot is unavailable when the candidate slot is one of a downlink slot a hybrid slot or a flexible slot.

17. The baseband processor of claim 15, wherein the offset is a measure of a delay of a non-terrestrial network link.

18. A base station comprising a processor configured to perform the operations comprising:
- determining a timing advance based on at least a random access preamble reception;
- determining an uplink offset based on the timing advance;
- determining a candidate slot for an uplink reception based on at least the offset;
- determining if the candidate slot is available for the uplink reception;
- using the candidate slot for the uplink reception when the candidate uplink slot is available; and
- using the next available slot for the uplink reception when the candidate uplink slot is not available, wherein where the next available slot is one of a previous slot of the candidate slot or a next slot of the candidate slot.

19. A user equipment (UE) comprising a processor configured to perform the operations comprising:
- receiving, from a base station, timing advance information;
- determining an offset based on the timing advance information;
- determining a candidate slot for a Channel State Information (CSI) reference resource based on at least the offset;
- determining if the candidate slot is available for the CSI reference resource;
- using the candidate slot for the CSI reference resource when the candidate slot is available; and
- using another slot for the CSI reference resource when the candidate slot is not available, wherein the another slot for the CSI reference resource is one of a previous slot of the candidate slot or a next slot of the candidate slot.

* * * * *